US 6,579,451 B1

(12) United States Patent
Avero

(10) Patent No.: US 6,579,451 B1
(45) Date of Patent: Jun. 17, 2003

(54) WATER DESALTING INSTALLATION THROUGH REVERSE OSMOSIS WITH PRESSURIZED SUPPLY TANKS IN CONTINUOUS KINETIC CYCLE

(76) Inventor: Manuel Barreto Avero, Isaac Albeniz 3., 38208 La Laguna - Tenerife (ES)

( * ) Notice: Subject to any disclaimer, the term of this patent is extended or adjusted under 35 U.S.C. 154(b) by 0 days.

(21) Appl. No.: 09/720,834
(22) PCT Filed: Jun. 25, 1999
(86) PCT No.: PCT/ES99/00194
§ 371 (c)(1), (2), (4) Date: Dec. 28, 2000
(87) PCT Pub. No.: WO00/00274
PCT Pub. Date: Jan. 6, 2000

(30) Foreign Application Priority Data

Jun. 30, 1998 (ES) ............................... 9801381
Aug. 7, 1998 (ES) ............................... 9801714
Jun. 2, 1999 (ES) ............................... 9801210

(51) Int. Cl.⁷ .............................................. B01D 63/00
(52) U.S. Cl. ........................ 210/195.2; 210/257.2; 210/416.2; 210/321.72; 210/134
(58) Field of Search ..................... 210/652, 195.2, 210/257.2, 170, 134, 416.1, 416.2, 321.72; 417/264

(56) References Cited

U.S. PATENT DOCUMENTS 3,556,682 A   1/1971   Masakatsu et al.
3,730,203 A   5/1973   Katzer et al.
3,825,122 A * 7/1974   Taylor
4,471,795 A   9/1984   Linhardt
4,661,321 A   4/1987   Byrd et al.
4,698,969 A * 10/1987  Raichlen et al.
4,705,625 A * 11/1987  Hart, Jr.
5,306,428 A * 4/1994   Tonner
6,110,360 A * 8/2000   Hart, Jr.

FOREIGN PATENT DOCUMENTS

ES   P9600294      2/1996
ES   P9800098      1/1998
FR   2 568 321 A1  1/1986
WO   97/29049 A1   8/1997

* cited by examiner

Primary Examiner—Ana Fortuna
(74) Attorney, Agent, or Firm—Ladas & Parry

(57) ABSTRACT

The water desalting installation comprises at least an auxiliary pump (1) and another high pressure pump (2) in parallel with an internal circulation pump (3), and at least one pair of feed chamber (5 and 5') which are pressurized alternatively, each of them forming a closed circuit, preferably toroidal, so that the water circulates always in the same direction and continuously, taking advantage of its kinetic energy in the valve actuation; it may have separation means to separate the water masses of different salinity, said separation means being comprised of pistons (7 and 7') having a spherical shape and of which the apparent density is similar to that of the water, said pistons being retained briefly during the cycle change by baskets (6 and 6') or equivalent devices, while the water circulates to the expense of its kinetic energy, the cycle changes being controlled by approximation (29 and 29') and housing (28 and 28') sensors, or by flowmeters (31, 31' and 32) or by salinity measures when such separation means are not available.

34 Claims, 15 Drawing Sheets

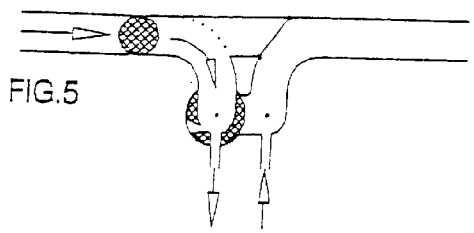
FIG.5
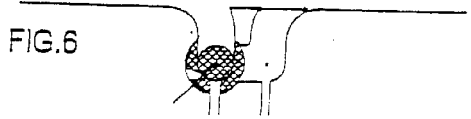
FIG.6
FIG.7
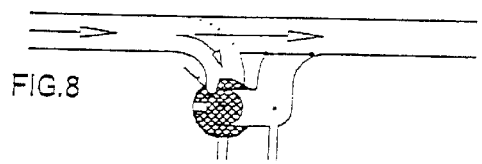
FIG.8
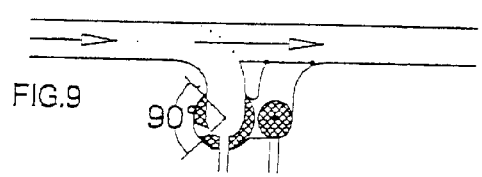
FIG.9
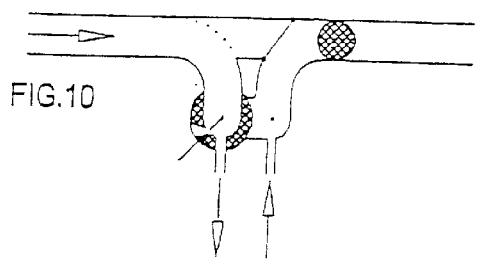
FIG.10
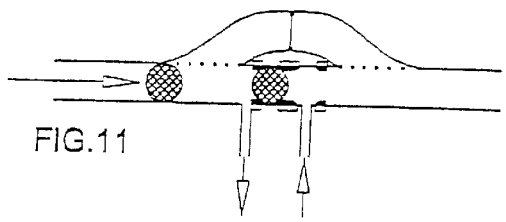
FIG.11
FIG.12
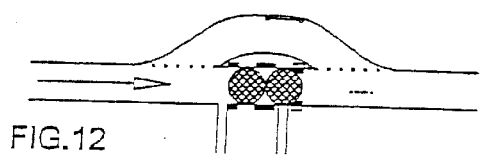
FIG.13
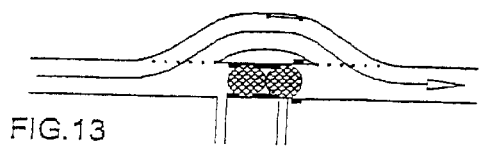
FIG.14
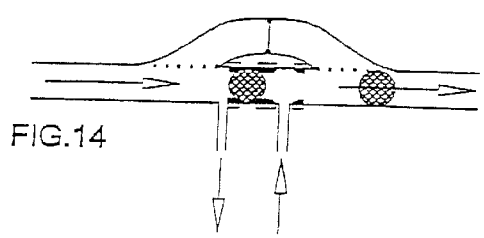

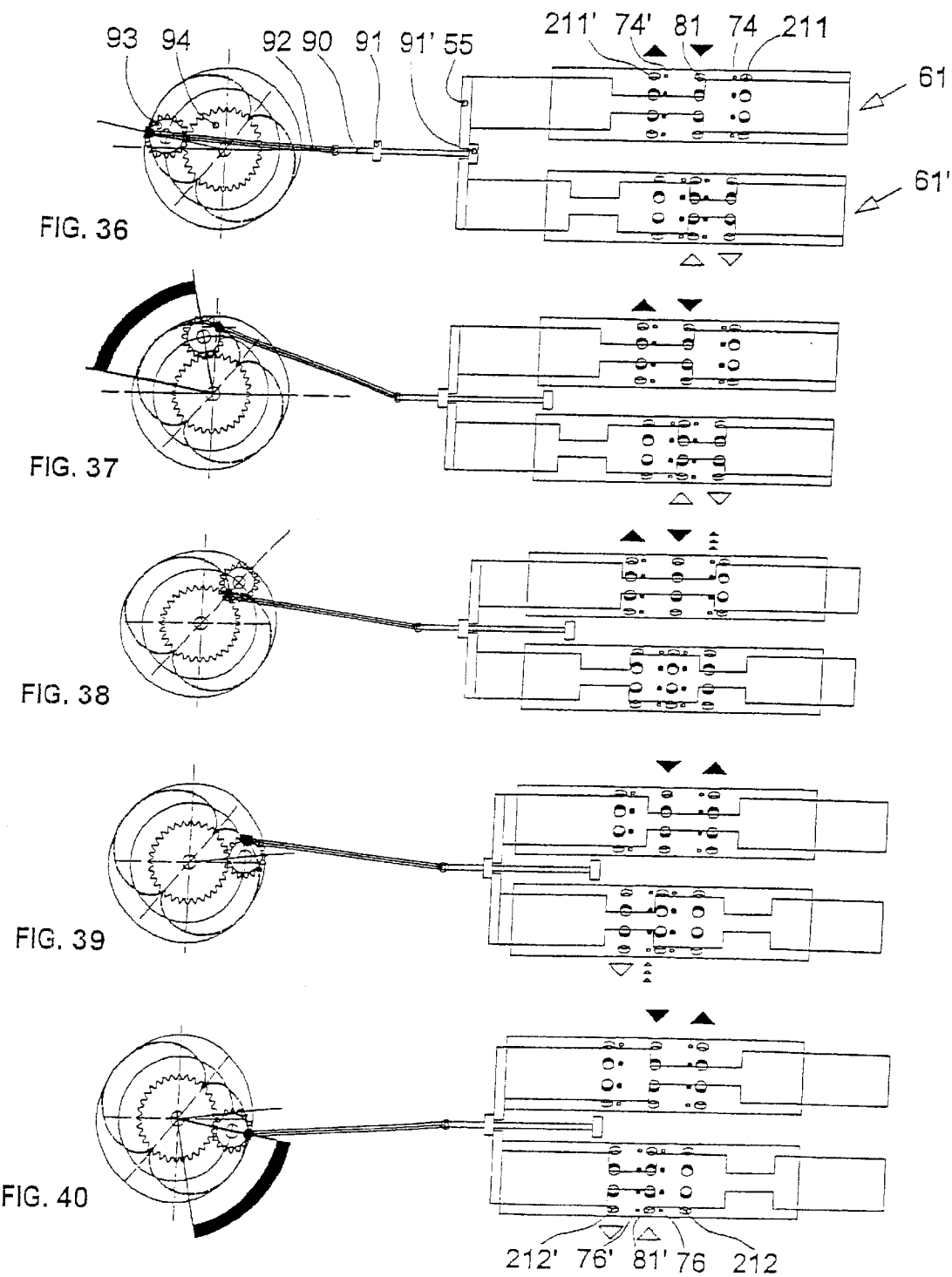

WATER DESALTING INSTALLATION THROUGH REVERSE OSMOSIS WITH PRESSURIZED SUPPLY TANKS IN CONTINUOUS KINETIC CYCLE

The invention relates to a system for desalinating water by inverse osmosis in pressurized chambers which provides some important features in regard to energy consumption, functionality and small size of the chambers by increasing the speed of the water for the filling and emptying thereof.

The Spanish patent application ES 9701877, owned by the same applicant, describes an inverse osmosis desalinating plant with pressurized mother chambers in the form of cylinders inside of which a piston circulates for separating different salinity water masses. Even though the plant's operation is extremely satisfactory, it is observed that, in the case of large-size facilities, it is not advisable to invert the movement of the water masses and the piston at the end of each of the mother chamber pressurizing cycles in view of the considerable kinetic energy that needs to be dissipated.

The present invention is based on a substantially different concept, namely the continuous kinetic cycle, whereby the different salinity water masses circulating through the mother chamber always circulate in the same direction, without stopping, so that dissipating the kinetic energy of the moving water mass and subsequently accelerating it in the opposite direction becomes unnecessary. This results in considerable saving of energy, reduction in chamber size, improved reliability and longer equipment life.

The system is first and foremost characteristic in that the two or more pressurized mother chambers used for storing the water to be desalinated are no longer shaped in the form of a straight-line tube, and may be either fitted or not with a piston for separating the water to be desalinated and the brine. The chamber described hereunder is ring-shaped, so that the start and the end of the tube are connected and thus form a closed circuit, the tube being toroidal, continuous zigzag, helicoidal or otherwise shaped, no matter how whimsical or functional, the sole condition being that its start and end are connected to form a loop or closed ring circuit.

The second characteristic is that, when the system is fitted with a piston, said piston is sphere-shaped, like a ball, enabling it to circulate along the curves of the continuous tube, and that its weight is approximately that of the density of the water, so that it may be entrained in the flow and will not be centrifuged in the curves as a result of its excessive density. Any material may be used, such as metal, plastic, etc. An "elasticity" feature may also be added, such as that present in rubber, which offers very little friction when wet and is capable of adequately withstanding direction changes or slight impacts against the walls, and it may even be formed by an accumulation of low-hardness gels, rubbers or elastomers such as the silicones used in mammary prostheses, or even a simple hollow rubber ball filled with water or some other substance providing it with sufficient resiliency to adapt to the route.

The third characteristics refers to recovery or parking mechanism for the ball or piston, a kind of basket or baseball glove, installed for receiving the sphere and sending it back along the same route, combined with a fluid bypass through a non-return valve of a special design which is opened by water's inertia, in a manner that, upon closing the entry of the water into the chamber, the mass rotating inside the chamber is not restricted but is free to circulate inside the ring at the expense of the kinetic energy contained in the moving mass, which need not be stopped and then placed in motion again as in the case of an alternate movement piston, the only element needing to be stopped being the small mass of the sphere-shaped piston, if fitted.

The system also comprises valves, pumps and a piston-position detecting system, all of which operate in programmed fashion to achieve the desired result.

In order to solve the above problems, several improvements have finally been introduced in inverse osmosis water desalination plants with continuous kinetic cycle mother chambers which, without substantially modifying the operation principles set forth, greatly simplify their practical embodiment.

The first improvement consists in introducing two three-way slide valves mechanically coupled onto one another. The normal and simple condition in a three-way slide type valve fitted with cylinder and radial ports is for the slide to be fitted with a single groove and for the central intake of the three port lines to be the common inlet or outlet, so that when the slide is at one end, the ports on that side are connected to the center, and when at the other end, that other side is connected also to the center. The previously described six-way double-groove valve presents a problem in that the times needed for filling and emptying the mother chambers are not the same, and thus the volumes that have to be handled in one chamber and the other are different. This is because the closing and opening time sequences are not the same in each chamber, since the first chamber to close is the last to open, and during this time frame the second chamber has to open and close, the operational time of this second chamber thus being much shorter. There are two means of solving this problem: the fist solution consists in providing one of these three-way valves with a double groove in order to invert the operation, namely the ports which in the first case are open, are now closed, and vice-versa; the second solution consists in dividing the valve into six ways, i.e. a double set of three ways, and invert the operational direction of one in respect to the other. This second solution requires the inclusion of a mechanism providing movement to one slide in one direction while the other slide is moving in the opposite direction.

This justifies the selection of two three-way valves, one of them being fitted with the double groove slide, although more can be said on the subject. The valves proposed are slide-type valves with radially arranged ports in the form of circular holes which provide for pressure compensation. Furthermore, the valves are fitted with a double sleeve or external housing which delimits several collecting chambers for these ports, individualized by means of ring separators. These chambers play an important role here, not only related to the manifold communicating the external connections with the corresponding ports, but in that they allow the water to pass from the mother chambers when the circulation valves open, the water from the mother chambers being able to circulate in a continuous kinetic cycle; this means that, when liquid is trapped because the valves are closed to the exterior, the recirculation valves open as a result of the kinetic energy, with the water circulating over itself in a closed loop, thus avoiding ramming impacts and maintaining the water mass in motion until the next and immediate operation comes along.

The second improvement consists in depressurizing the mother chambers prior to unloading the brine to the exterior; this increases the service life of the recirculation valves, which are thus able to operate in a less demanding manner. This prior depressurizing is performed through ports of a very small section which open immediately before the main discharge ports.

As is well known, there are several means of operating the various types of slide valves, either hydraulic or mechanical, and their positioning is no problem given the present numeric control computer systems, stepper motors and similar devices available. Thus, the third improvement consists in a very simple mechanical driving mechanism operated by a constant angular motion shaft such as an electric motor shaft through a speed reduction box, which makes the valve's slides to stop at each end when the mother chambers are being filled or emptied, and which furthermore is provided with a slight stop or reduced speed at a point in its stroke corresponding to the 'prior pressurizing' operation, as described in Spanish patent application ES 9800098, enabling the mother chambers to capture the high pressure from the membranes, the rest of the stroke being performed as fast as possible. This is achieved through a mechanism of planetary gears having appropriate diameters, with any point of the planetary gears moving through an epicycloid trajectory.

Inside the valves, the water suffers abrupt direction changes which make the flow to be fairly turbulent, all the more so if the water flows at a relatively high speed designed to reduce the size of the valves. However, removal of the prior art movable pistons requires the flow be as laminar as possible in order to avoid the separation surface between the water masses with a different salinity level from becoming excessively deformed, leading to the mixing of the masses. The object of the fourth improvement is to reduce the turbulence, and this is achieved by installing flow laminators at the valve outlets.

The following advantages are evident in the desalinating plants produced according to the above mentioned four improvements in respect to the prior art:

1. Both in the Spanish patent applications ES 9600294 and ES 9800098 and in the initial concept of the continuous kinetic cycle mother chambers, too many 'T' connections are used between the pipes, the valves and the mother chambers. This impairs the hydrodynamics in the system. In this case, this problem is greatly reduced.

2. The use of separate valves for each operation is more costly and more difficult to synchronize than the use of one single six-way valve. This solution can be further improved if the system is fitted with two double sleeve three-way valves, i.e. with the two cylindrical bodies placed concentrically, operated simultaneously. This improves the fluid's hydrodynamics, in addition to facilitating access to the various parts for assembly, maintenance or repair purposes, in view that all the valves are grouped in a very compact design, thus enabling their size to be reduced and providing an esthetic and functional final design. It should be borne in mind that 14 valves are necessary: 4 mechanically driven valves (which, when simplified, comprise two three-way units), 4 single direction non-return valves, 2 recirculation valves for each chamber (these two valves constituting the key element in the system for preventing the slowing down of the fluid and for implementing the continuous kinetic cycle), 2 prior pressurizing valves, and 2 prior depressurizing valves.

3. Production raw material and labor costs are substantially reduced, access for replacement, repair or maintenance is improved, and, above all, the complete set of desalinating plant operation valves can be easily transported, with only pipework assembly and pump connection tasks being performed on-site.

4. A perfect solution is given to the operation assymetry problem caused by the six-way valve, in that this valve, as described, requires both mother chambers to be provided with different operation times and therefore different volumes.

In order to complement this description and to help toward a better understanding of the characteristics of the invention, a detailed description of a preferred embodiment is given hereunder based on a set of drawings attached to this specification which form an integral part thereof, and in which the following is represented in a merely orienting and non-limiting character.

FIG. 1 schematically shows the operation of the system in a given point in the cycle, and depicts a chamber that is about to end its process of supplying water to be desalinated to a membrane, is almost full of brine (striped zone) and is divided by the sphere-shaped piston. At the same time, the lower chamber has just emptied its brine content and is now fully filled with new water. It may be seen that the sphere-shaped piston is collected by a 'U' shaped basket, with its open portion oriented to the right for receiving the piston. It is also evident that the force of the water has opened a valve along a bypass, so that the water has not ceased to flow.

FIGS. 5 to 10 show a temporary operation sequence in an alternative piston collecting version, a so-called concealment sequence.

FIGS. 11 to 14 show a temporary operation sequence in an alternative piston collecting version, a so-called double piston sequence.

FIGS. 15 to 18 correspond to the same moments in the cycle shown in FIGS. 1 to 4, and show a variation in the system wherein no separating piston is provided.

Figure 19:
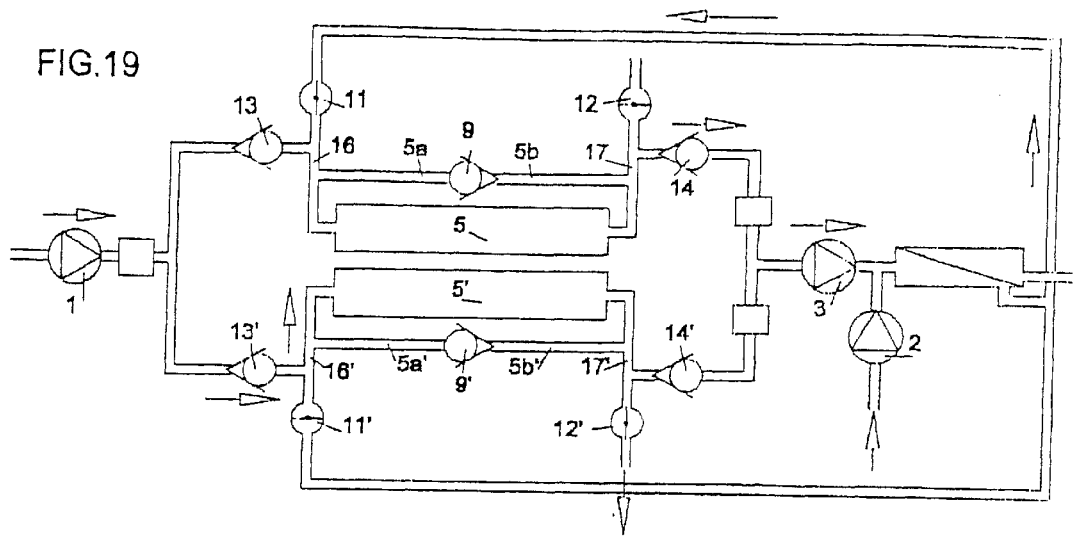
Figure 20:
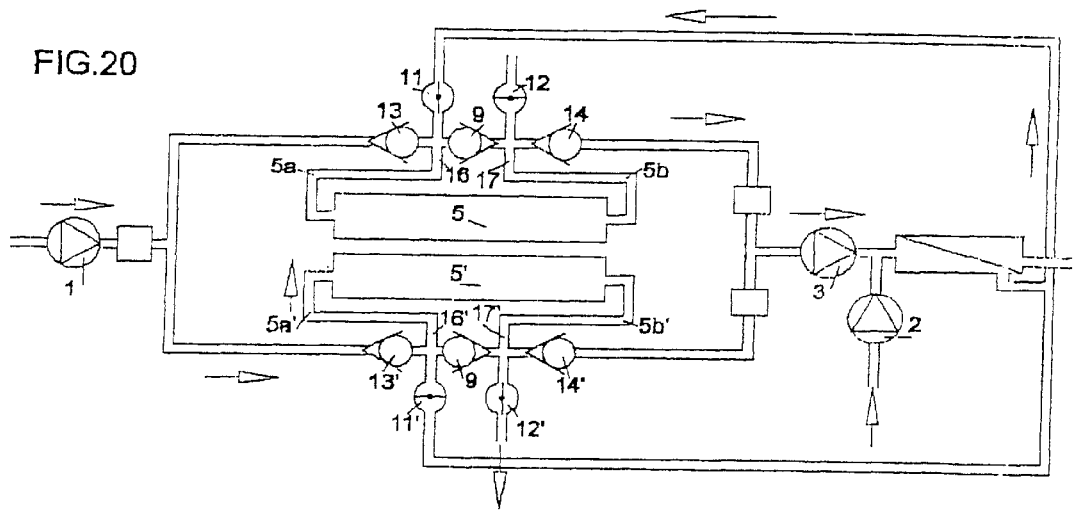
Figure 21:
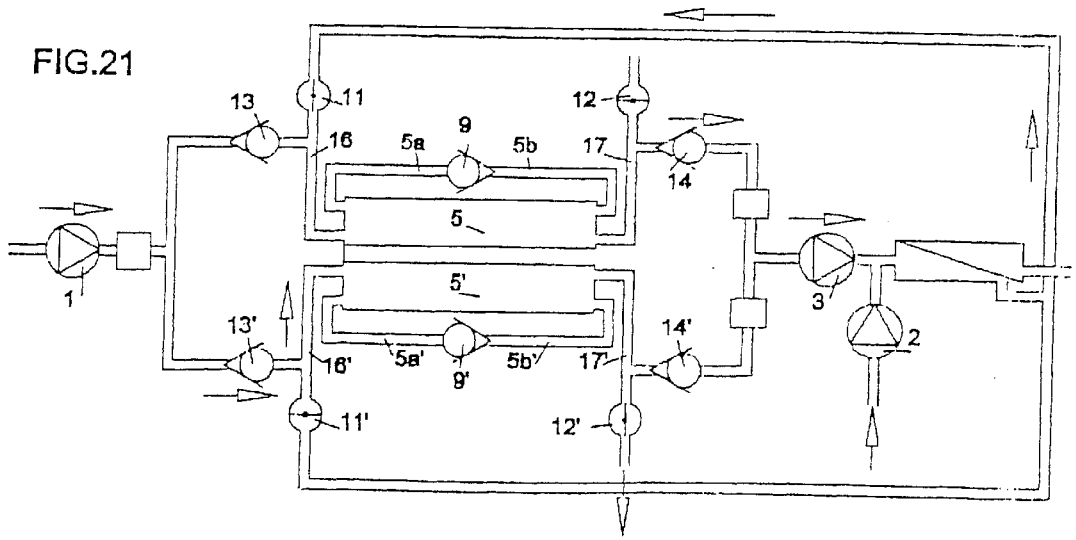

FIGS. 19 to 21 show the same circuit, the same principle and the same operation, although this may not appear to be evident because the drawing has been approached differently. The single difference lies in that the water load is bound to be greater or lesser, depending on the circuit diameters. The purpose is to prevent the chamber, which closes to form a ring, from having the same diameter throughout its route, in a manner that one length may be provided with one diameter and another length, which closes the circuit and is fitted with a non-return valve, may be provided with a different diameter; it may even have several lengths of various diameters without in the least influencing the system's operation principle.

Figure 22:
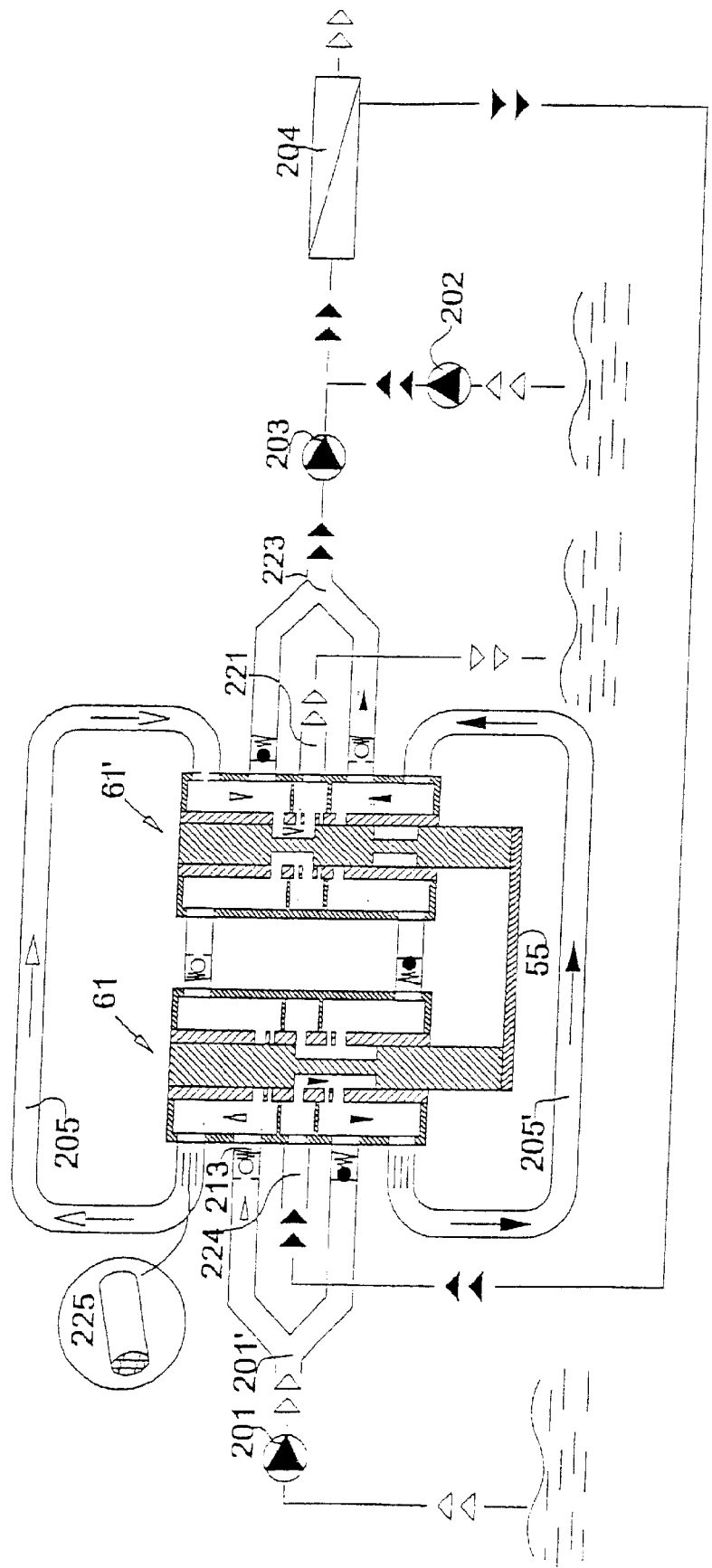

FIG. 22 shows a schematic view of the desalinating plant assembly of the invention.

Figure 23:
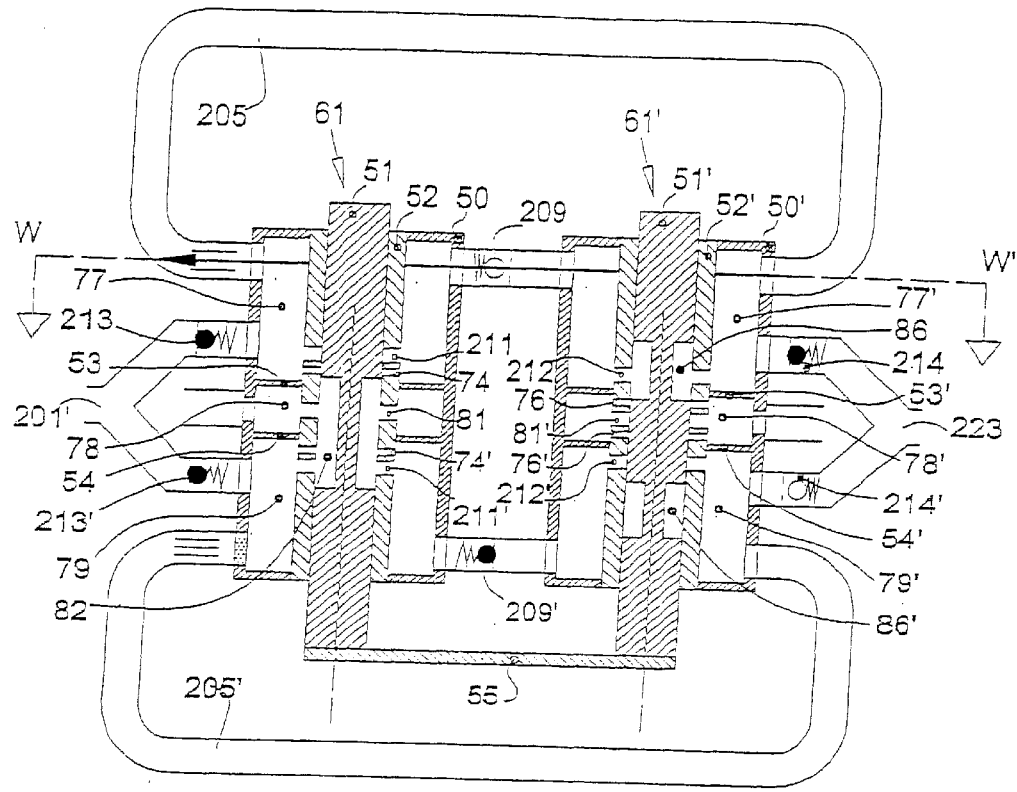

FIG. 23 shows a schematic plan view of the two three-way valves.

Figure 24:
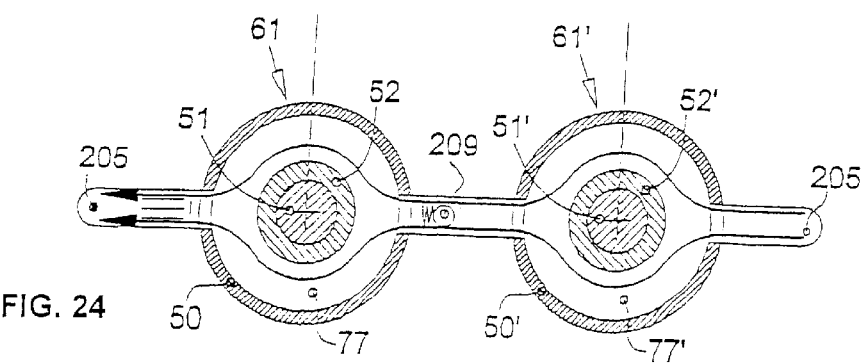

FIG. 24 is an elevation section of the preceding schematic view.

FIGS. 25 to 31 show the arrangement of the valves and the flows of various fluids in several desalinating plant cycle stages.

Figure 32:
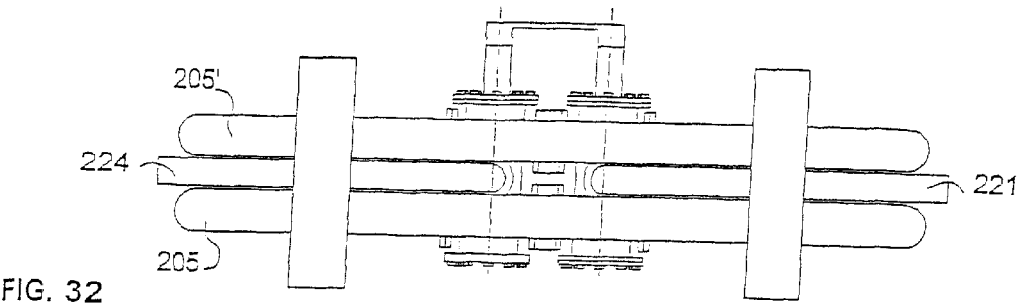

FIG. 32 shows a bottom view of the desalinating plant of the invention.

Figure 33:
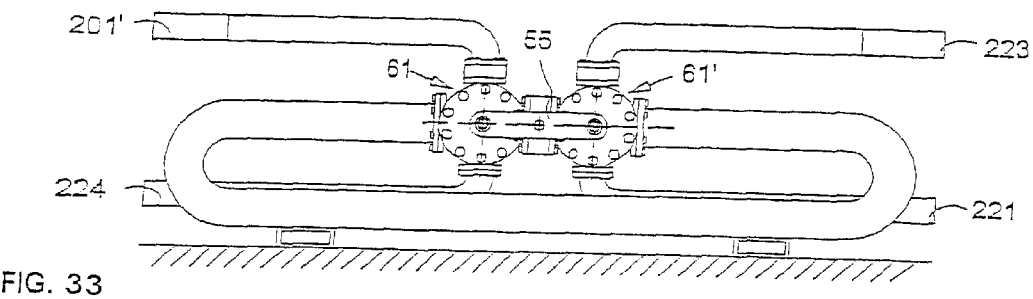

FIG. 33 shows an elevation view of the desalinating plant of the invention.

Figure 34:
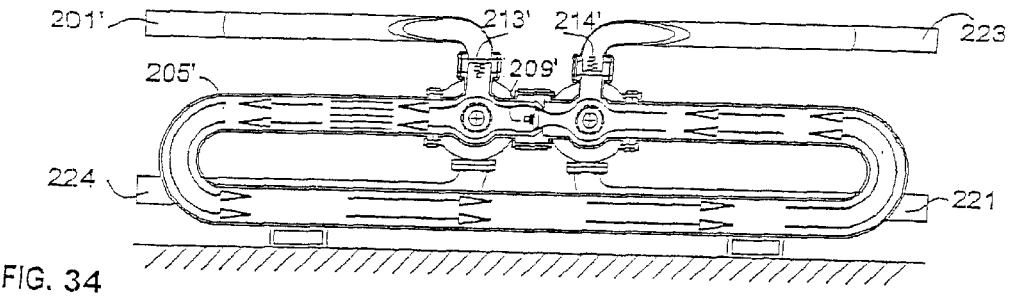

FIG. 34 shows an elevation semi-sectional view of the desalinating plant of the invention.

Figure 35:
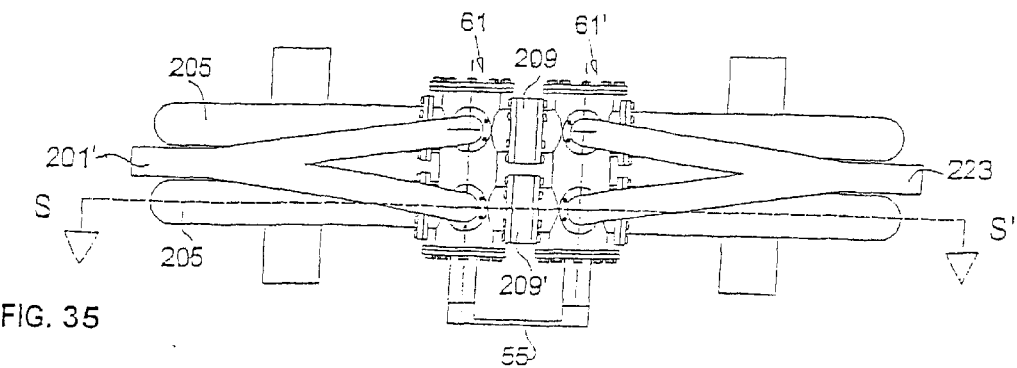

FIG. 35 shows a plan view of the desalinating plant of the invention.

FIG. 36 shows a schematic view of the epicycloid operation at the right end of its stroke.

FIG. 37 shows a schematic view of the epicycloid operation at the start of its useful stroke.

FIG. 38 shows a schematic view of the epicycloid operation at the point where the first mother chamber is prior pressurized.

FIG. 39 shows a schematic view of the epicycloid operation at the point where the second mother chamber is prior depressurized.

FIG. 40 shows a schematic view of the epicycloid operation at the end of its useful stroke.

Figure 41:
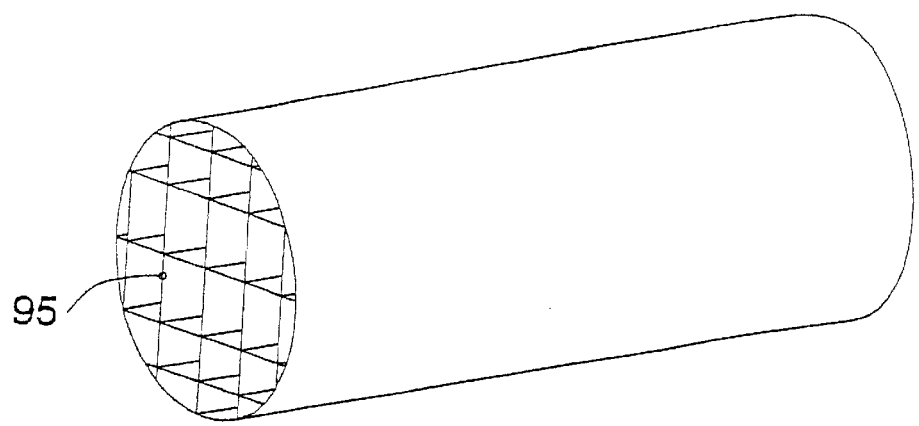

FIG. 41 shows a sheet lattice design of a flow laminator.

Figure 42:
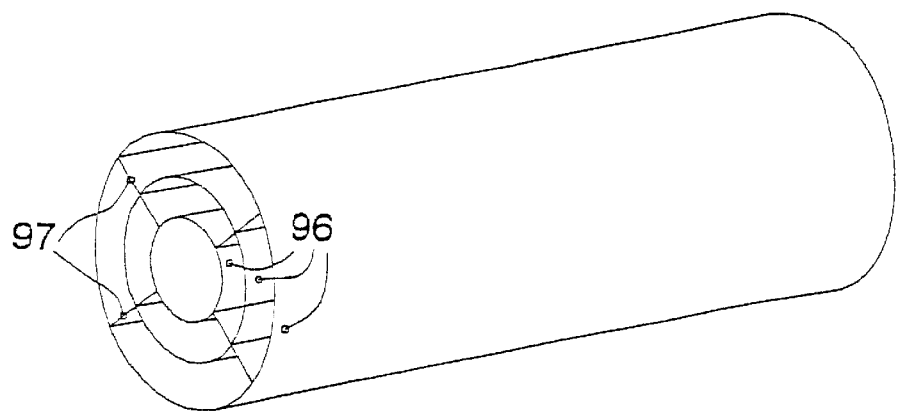

FIG. 42 shows a concentric tube and radial sheet flow laminator.

Figure 43:
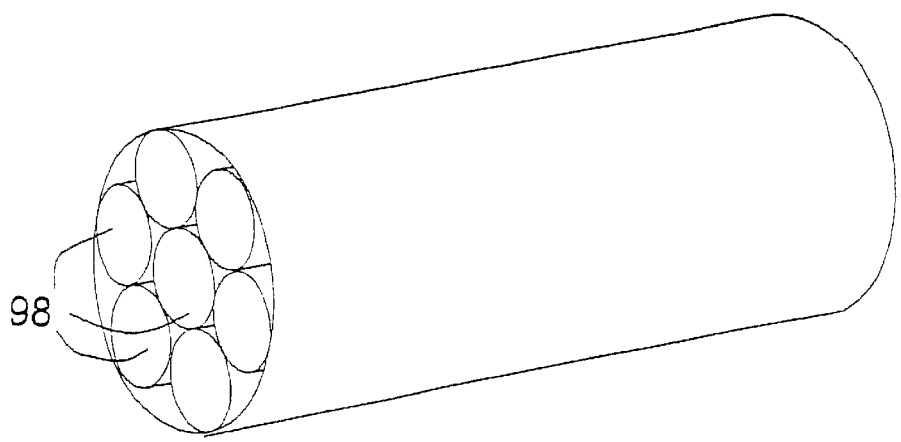

FIG. 43 shows a flow laminator formed by a plurality of parallel tubes.

In FIGS. 22 to 43, the brine is represented in the form of darkened areas; the raw water, with no darkened area. The white arrows represent low pressure, whereas the black arrows represent high pressure. The recirculation and non-return valves are shown in black when closed or in white when open.

According to FIGS. 1, 2, 3 and 4, the inventive system comprises two ring-shaped (5 and 5') mother chambers fitted with respective sphere-shaped pistons (7 and 7') which act as partitions for separating the water to be desalinated from the brine. The pistons are detected by piston approach sensors (29 and 29') and piston lodging sensors (28 and 28'). The screens (10) and (10') serve as protections for the possible tendency of the pistons to be channeled through bypasses (8 and 8').

The baskets (6 and 6'), formed in the shape of a 'U' with the open part facing either the left or the right, function to collect the sphere-shaped pistons (7 and 7'). The bottom of the baskets are fitted with a small non-return valve (30 and 30') which opens under slight pressure.

Said chambers (5 and 5') receive the water to be desalinated (19) supplied from an auxiliary pump (1) through the non-return valves (13 and 13') when the valves (12 and 12') open.

The internal circulation pump (3) supplies water to the chambers (5) and (5') and to the membrane (4) through the non-return valves (14) and (14').

Pump (2) is a main or high pressure pump which supplies the membrane (4) with the precise flow to be permeated, which subsequently leaves the system as product water (20).

Figure 1:
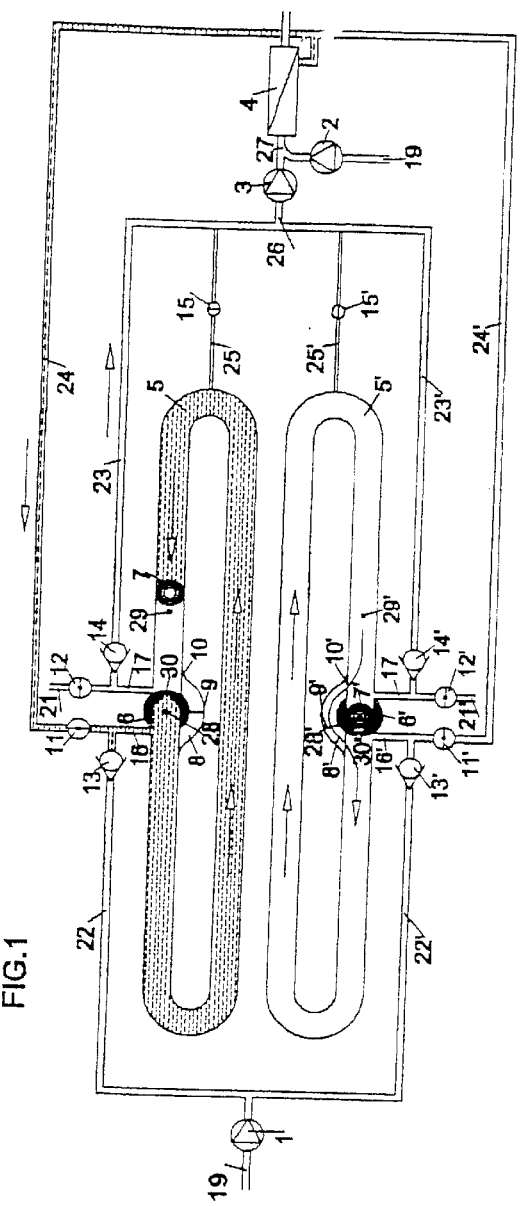

Operation is as follows:

Starting from the position shown in FIG. 1, namely any point in the cycle, piston (7) and chamber (5) are shown arriving at the end of their stroke and are about to excite the piston approach sensor (29), while behind the sphere-shaped piston the rejected brine leaves the membrane (4) through return conduct (24), passes through the open brine entry valve (11), goes through entry conduct (16), enters the chamber, fills it with brine (striped area) and pushes the remaining water to be desalinated in said chamber to the left of the piston (7), shown in white background (no stripes); this water is then sucked by the internal circulation pump (3), leaves the chamber through the outlet conduct (17), passes on to the non-return valve (14), and is sucked through the pressurized conduct (23) by the internal circulation pump (3), and, through common conduct (26), is inserted in the membrane via membrane conduct (27). This water does not pass through the membrane because it is circulating in a closed circuit, its mission being to entrain the salts left behind by the water which remains in the membrane, this being entirely dependent on the high pressure pump (2). Provided the pressure in the high pressure pump (2) does not exceed the permeating pressure, on salinity residues remain in the membrane, the function of the internal circulation pump (3) being merely to circulate the water, in a closed circuit, between the membrane and the chambers.

As can be seen, the basket (6) for receiving piston (7) is not in a position to receive it, since it is facing in the opposite direction, namely towards the left of the drawing while the piston is coming from the right side.

On the other hand, chamber (5'), shown at the lower end in FIG. 1, has just been filled with new water and the piston has just entered the basket (6') from the right side, the piston lodging sensor (28') has detected the piston (7') and has closed the unloading valve (12') and cut the water being filled via the auxiliary pump (1), conduct (22') of non-return valve (13') and entry conduct (16'). In view that the water in this chamber circulates clockwise, upon suddenly closing the unloading valve (12'), the water inside the chamber attempts to continue rotating in the same manner for a short period of time, and the force exerted by this mass at the expense of the fluid's kinetic energy makes the water to branch off via the bypass conduct (8') and to open the bypass valve (9'), while the pressurizing valve (15') opens and pressurizes chamber (5') through the pressurizing conduct (25') at the pressurizing pressure provided by the high pressure pump (2) circuit, up to now at atmospheric pressure but now at the pressure prevailing in chamber (5).

Figure 2:
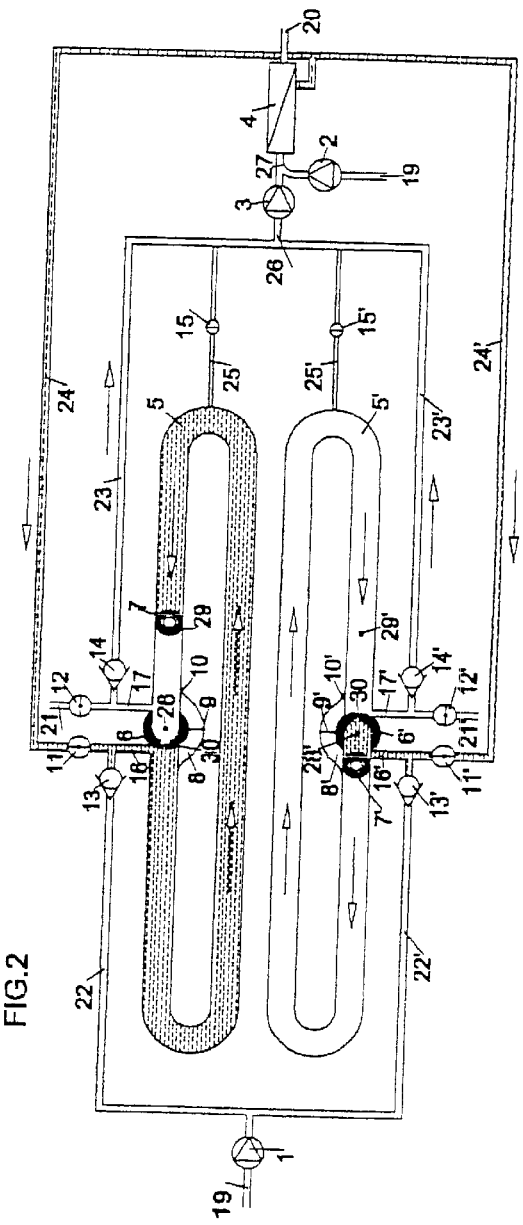
FIG. 2 shows the same system shown in the preceding figure, in a state where the first chamber basket has rotated 180° to enable the piston to follow its course from right to left. This is an operation step where both chambers simultaneously supply their contents to a membrane.

Meanwhile, piston (7) in chamber (5) shown in FIG. 2 has passed through the piston approach sensor (29), which issues the order for the basket (6') to rotate 180° while the brine entry valve (11') opens, as shown in FIG. 2. The baskets (6) and (6') are fitted with a small non-return valve (30) and (30') on the part opposite its inlet which opens, in the manner of the bypass valves (9) and (9'), as a result of the fluid's kinetic energy, said energy coming from the part opposite the piston (7) and (7') entry point, namely the back side, so that the piston leaves the basket (6') and is positioned to be pushed by the brine coming from membrane (4) and by the internal circulation pump (3) through return conduct (24') and brine entry valve (11'), which has just now opened.

This is an important time for the system, since the two chambers are working in parallel, overlapping their functions, both supplying their content to the membrane within a short period of time which ends when piston (7) enters the basket (6), only chamber (5') being operational. This simultaneous operation is necessary for preventing abrupt chamber changes, thus avoiding the membrane to be subject to abrupt pressure changes.

Figure 3:
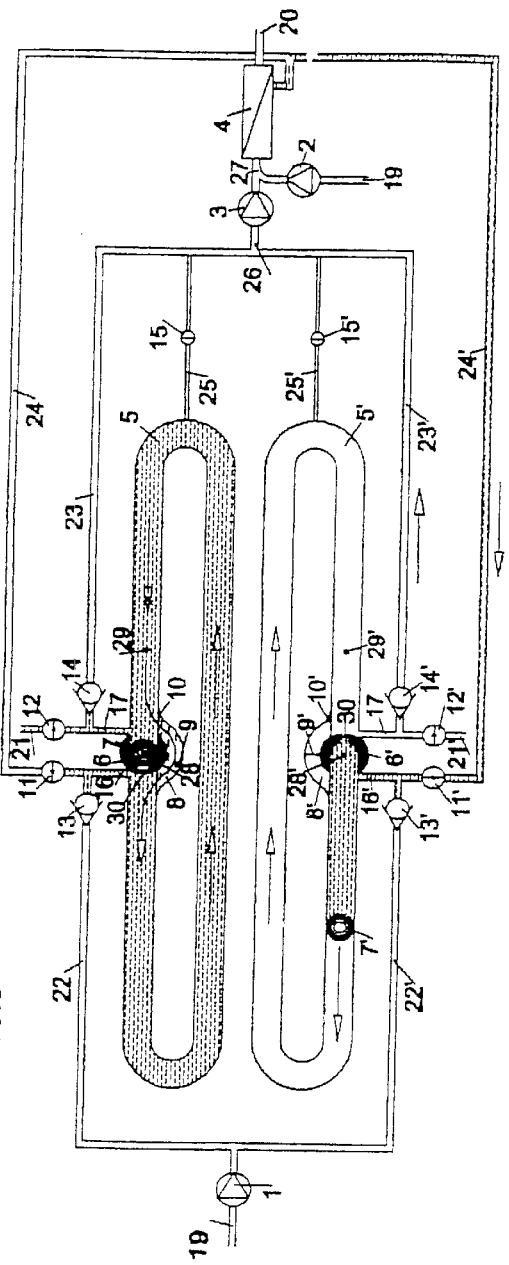
FIG. 3 shows that the fist chamber is now completely filled with brine, the basket has collected the piston and the brine flow has opened the bypass valve, while the lower chamber is supplying new water to the membrane and is beginning to collect the rejected brine.
Figure 4:
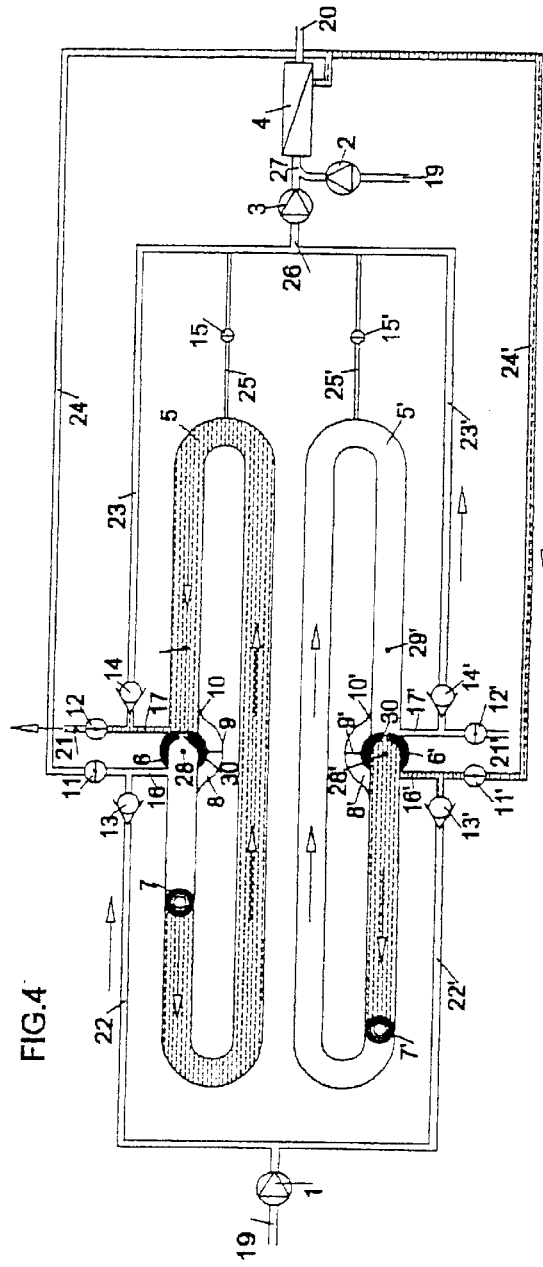
FIG. 4 shows that the upper chamber is renewing its content while sending the brine off to the exterior, and the lower chamber is functioning to supply water to the membrane while collecting brine from the right side of the piston.
Figure 16:
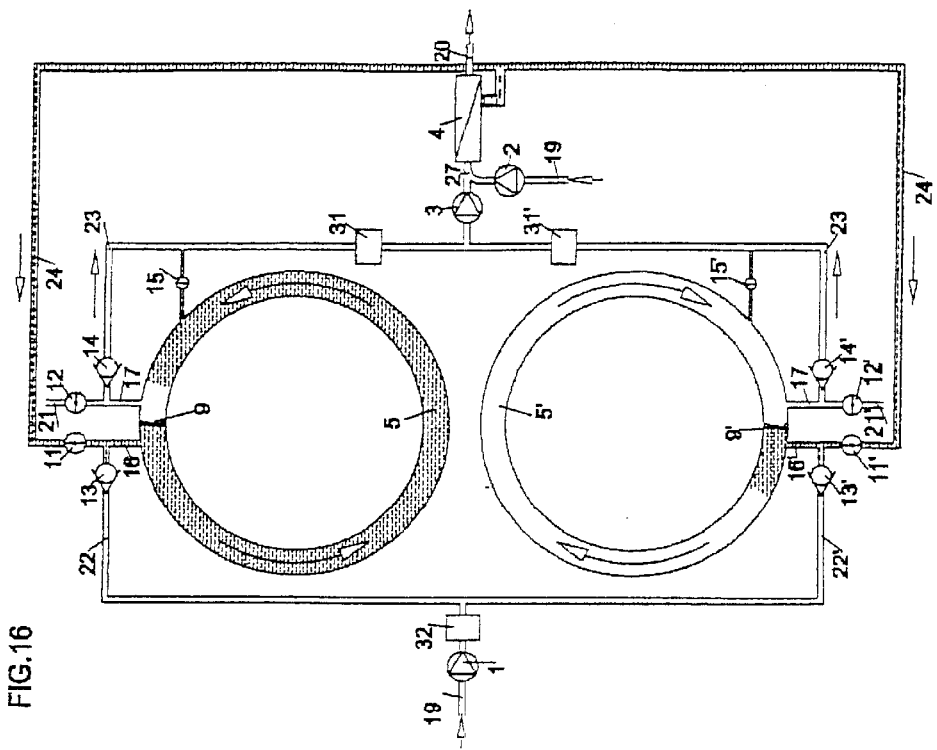
Figure 15:
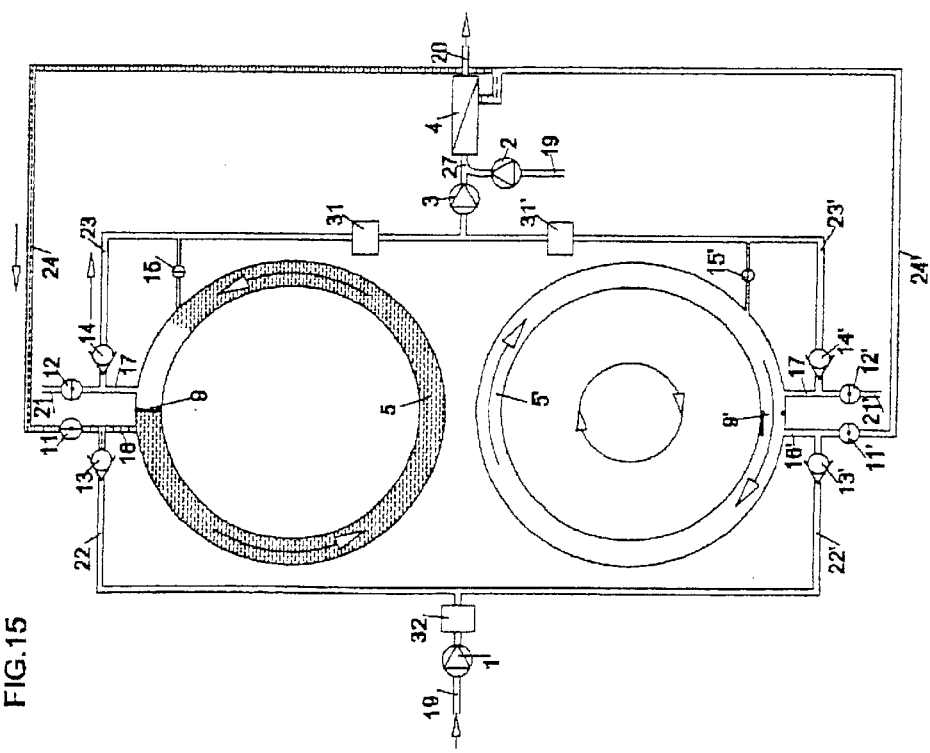
Figure 17:
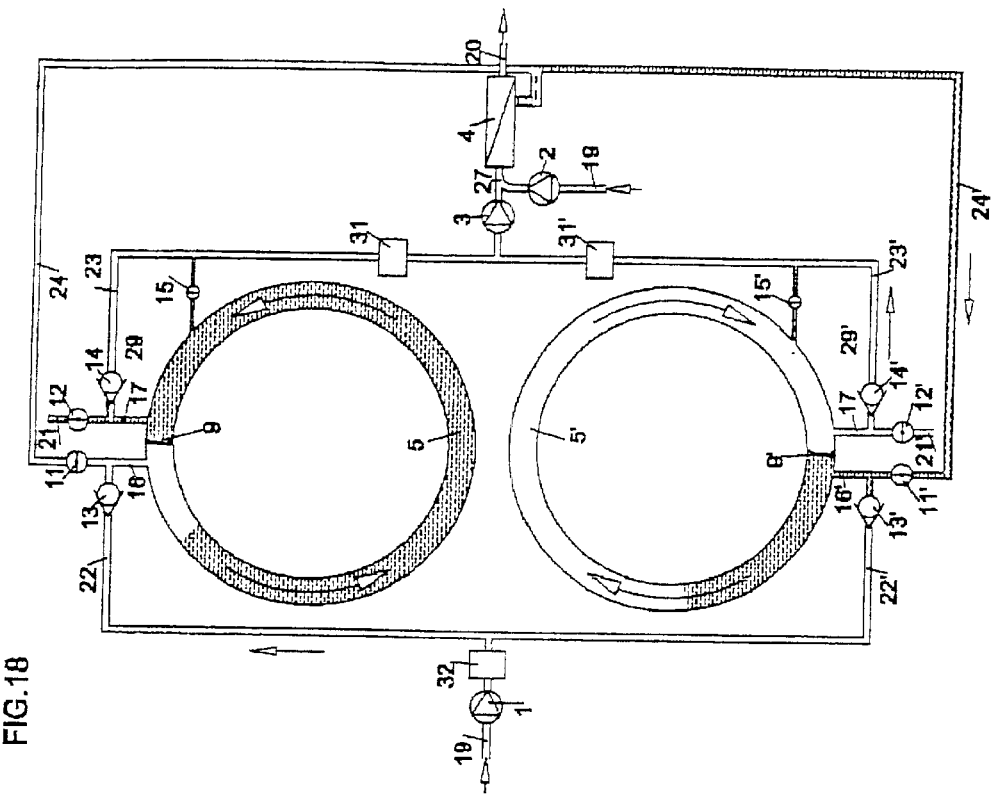
Figure 18:
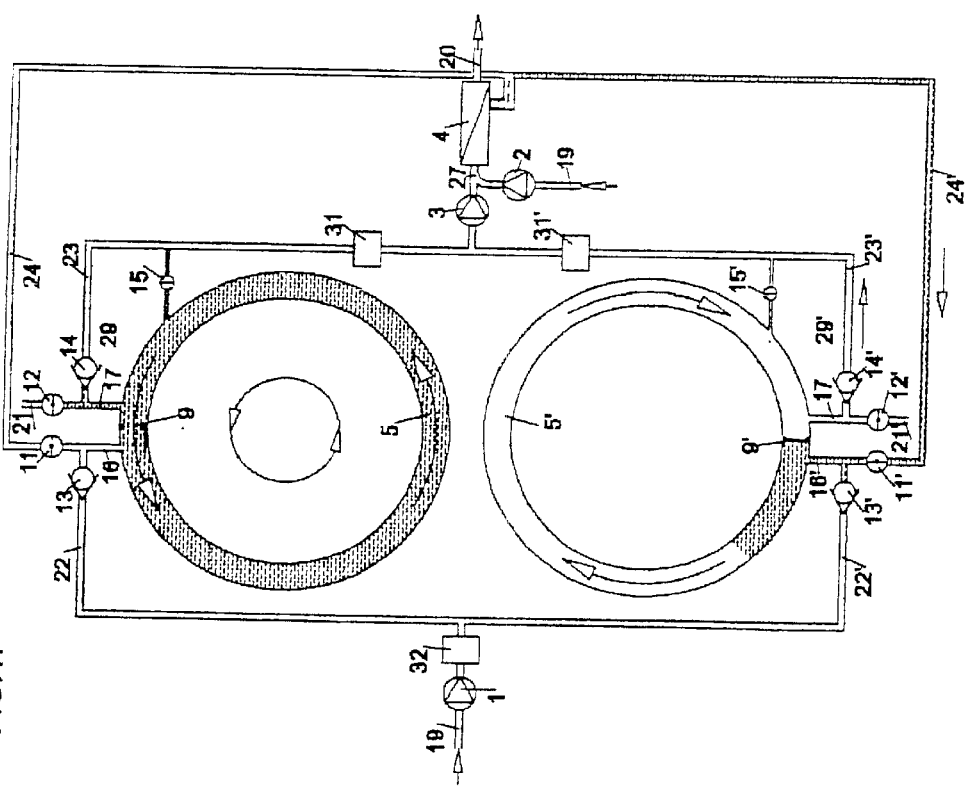

When piston (7) reaches the basket (6), as shown in FIG. 3, the chamber (5) (striped zone) is full of brine. At this point, as in the case of chamber (5'), which is filled with water to be desalinated, the pressure exerted at the expense of the kinetic energy by the brine mass rotating counter-clockwise opens the valve (9) in bypass (8) and is momentarily placed in motion, without having to stop the fluid mass, for a time long enough to act on the unloading valve (12), which until now was closed (FIG. 3), and opens as shown in FIG. 4, whereupon the brine exits through conduct (21). The basket (6') is now positioned facing the left of the drawing in order to release the piston, as shown in FIG. 4.

As can be seen, this is a single operation in which the chambers (5) and (5') have both contributed their content to the membrane according to an alternate sequence and collected the reject brine on the opposite side of piston (7) and (7'). The important aspect in this system is that the movement of the water is almost continuous, with only a slight pause in the valve changing operation, which may be as fast as necessary, while the water in the chamber continues to rotate. Therefore, the positive and negative acceleration and deceleration forces of the moving liquid mass inside the chambers may be ignored.

After describing an embodiment and operation of the system that is the object of the invention, a series of variations and replacements may be evident to an expert on the subject without altering the system's operation principle, thus rendering it more adaptable to specific requirements which it is believed are included in the protection of this patent.

Thus, when the volume of water to be treated is very large, it is advisable to use a piston concealment strategy in order to prevent the water masses from suffering the deviations imposed by the bypass conducts (8 and 8'). See temporary sequence in FIGS. 5 to 10. For small equipment and/or low cost installations, it is better to provide a solution involving externally attached double pistons, as depicted in the temporary sequence in FIGS. 11 to 14, not described herein in detail in view that these figures will prove self-explanatory to an expert on the subject.

A particularly interesting alternative involves ignoring the piston, which would be replaced by a mere division plane between the water masses, also replacing the physical elements by specific process conditions such as the need for a laminar flow rate and the assumption of certain limitations, such as a certain degree of mixing in the dividing plane. This is for the benefit of a less complex design and a higher fluid speed, which may be required in systems with a high degree of reliability in places where no specialized labor is available for maintenance tasks, and where it is desirable to reduce the size of the chambers even further. Such a system is shown in FIGS. 15 to 18, which show that the mother chambers are toric (although, as in the previously mentioned system, they may be fitted with straight and curved lengths) in order to facilitate a non-turbulent flow where the piston and associated detection fixtures are longer provided, being replaced by respective flow meters (31, 31' and 32) which control cycle changes in the mother chambers. In order to avoid an offsetting of the time in the water mass separating plane because of cycle changes, the flow meters (31, 31' and 32) are synchronized, although it is likewise possible to detect the position in the separation plane via the salinity sensors, conductivity sensors, etc., in the preferred embodiment, distributing them adequately in convenient places, or simply by using a timer device.

In the patent being advocated, the valves are capable of closing with great rapidity, the shorter the operation time of each valve and subsequent operation sequences of all the valves, the better, since a maximum use is made of the fluid's velocity and kinetic energy; additionally, the auxiliary pump No. 1 stopping time may reach zero. This inactive period or stoppage time of chamber-filling pump No. 1 is the result of an intermediate state in the operational sequence, as explained above in detail, and refers to a stage where both chambers are under high pressure while supplying their contents to the membrane.

A further important advantage deriving from this consists in that, since valve operation speed may as fast as necessary, as in the case of an internal combustion engine, the valves may be sequenced with the help of a cam or simply by forming them into a single group, as with multiple way valves. In the case of high working speed chambers, tests conducted on a prototype reveal that their size may be substantially reduced—in the order of more than 200 times—particularly in the case of the piston-free chambers shown in FIGS. 15, 16, 17 and 18, the volume increase deriving from the resiliency of the chamber walls when pressurized via the high pressure pump (2) being less than said two hundred times; thus, pump and membrane pressure fluctuations would be practically imperceptible. This means that the prior pressurizing valves (15) may be omitted in view that there is no need for them, thereby considerably reducing the number of valves installed. As seen in FIGS. 19, 20 and 21, valve No. 9 is now externally integrated to the rest of the valves, simplifying both the design/installation of the valve assembly and the integration of the valves into a single-body multiple valve.

The same system shown in FIGS. 19, 20 and 21, fitted with reduced diameter lengths, is even more valid if the kinetic cycle water rotation time is short, since load loss in small-diameter tubes is greater than that in FIGS. 15, 16, 17 and 18 and the water needs a shorter stopping time; however, if the valve change speed is great, as intended, the system is valid because ram impacts are prevented and the next cycle in entered into with the water or brine under movement, without stoppages, and taking advantage of the kinetic energy, as previously explained.

FIG. 22 schematically shows the continuous kinetic cycle system embodied according to the best improvements implemented, including the rest of the desalinating plant elements. In view that this operation has already been described according to FIGS. 1 to 17, the following description addresses the structural and functional differences introduced by the new improvements. As shown in FIGS. 1 to 17, the auxiliary low pressure pump (201) supplies raw water to auxiliary conduct (201'), and internal circulation pump (203) handles the same amount of water as auxiliary pump (201), and the same amount of rejected brine. This internal circulation pump (203) functions in a closed circuit with a small differential pressure which is equivalent to the load loss of the brine in the membrane, although the pump's housing is subject to the pressure of high pressure pump (202), which handles the product water flow at a high permeation pressure. The internal circulation pump (203) takes water from the high-pressurized conduct (223) and, after passing through the membrane, exits in the form of brine which enters the return conduct (224), also at high pressure. It should finally be stated that the unloading conduct (221) leaves the circuit and expels the brine practically at low pressure from the auxiliary pump (201). It should be noted that in both the mother chambers (205), (205') and the valves (61), (61') only raw water to be desalinated or brine circulates, since the desalinated product water is supplied to the exterior via the osmosis membrane (204).

After describing the system's aspects in connection with the inverse osmosis plant, the continuous kinetic cycle system is described hereunder as embodied in two three-way valves which do not alter the kinetic energy use principle but nonetheless provide a novel insight into the various elements involved. See FIG. 23.

FIG. 23 shows inlet valve (61) and outlet valve (61') mechanically coupled onto one another through a bridge (55). The entry valve (61) comprises an entry slide (51) fitted with a single groove (82) which slides axially inside an inlet cylinder (52) forming an annular space jointly with inlet housing (50). This entry space is divided into a first manifold (77), a central manifold (78) and a third manifold (79) by a first annular separator (53) and a second annular separator (54). The entry cylinder (52) presents a plurality of first brine entry ports (211) and a plurality of prior pressurizing ports (74), the latter being located nearer the first annular separator (53). Thus, the first entry manifold (77) communicates with the internal cavity in inlet cylinder (52). The central inlet manifold (78) is also in communication with the internal cavity in inlet cylinder (52) by virtue of a plurality of central inlet manifold ports (81) located along its middle plane. The inlet valve (61) thus described is symmetric in respect to this middle plane, which is perpendicular to its longitudinal axis, so that the second inlet manifold (79) communicates with the internal cavity of entry cylinder (52) through the equivalent second brine entry ports (211') and the prior pressurizing ports (74'). It should be understood that communication between the various manifolds is either possible or not depending on the position of the annular inlet groove (82) in inlet slide (51).

Concerning outlet valve (61'), it is shaped in similar fashion to entry valve (61), save that outlet slide (51') presents two annular grooves (86), (86') instead of one, as in the case of entry slide (51). Therefore, possible communication between the internal cavity of outlet cylinder (52'), first outlet manifold (77'), central outlet manifold (78') and second outlet manifold (79'), all of them forming annular volumes comprised between outlet cylinder (52'), outlet housing (50'), first outlet annular separator (53') and second outlet annular separator (54'), is established through the following holes. A plurality of brine unloading ports (212) in outlet cylinder (52') coincides with the first outlet manifold (77'), very near the first outlet annular separator (53'). A plurality of brine unloading ports (212') in outlet cylinder (52') coincides with the second outlet manifold (79'), and is positioned symmetrically in respect to the middle plane perpendicular to the longitudinal axis of outlet valve (61'). Finally, a plurality of ports in central outlet manifold (81') in outlet cylinder (52') communicates its internal cavities with central outlet manifold (78'). Two series of small prior depressurizing ports (76), (76') appear on each side of said outlet manifold ports (81').

The rest of the single direction flow valves are known from the previous patent. It is worthwhile pointing out that non-return valves (213 and 213') receive raw water from auxiliary conduct (201') and close in the event of higher pressure in the opposite direction; non-return valves (214 and 214'), having the same characteristics as the former, open to allow passage of the water towards pressurized conduct (223).

Finally, the main circulation valves (209 and 209') allow the 'continuous kinetic cycle' effect to take place, and only open for an instant when all the mother chamber inlets and outlets are closed to the exterior and the water is rotating inside the chambers in the form of a closed ring by virtue of its inertia or kinetic energy. In each cycle, namely one opening and closing motion of the main three-way valves, four 'continuous kinetic cycle' times are generated, two for each mother chamber (two for brine and two for water to be desalinated).

This effect is perceived in the instant represented in FIG. 23, when slides (51) and (51') are precisely in the position shown, with water neither entering nor leaving the first mother chamber (205) and is therefore impelled to open the first recirculation valve (209) by virtue of the energy entrained in its movement. FIG. 24 shows the water passing from one side to the other (from right to left, in the drawing) and circulating through the intermediate space existing between the inlet and outlet cylinders (52), (52') and the inlet and outlet housings (50), (50') which constitute the external body of the valves in question.

FIGS. 36 and 40 show a preferred embodiment of the epicycloid driving mechanism for the two slide valves (61), (61') by means of connecting bridge (55). The bridge has a hole in its central portion through which passes a driving rod (90) fitted with two butt ends (91), (91') designed to push the bridge (55) along both directions. The driving rod (90) is in turn driven by a planetary gear (93) rotating around a central wheel (94) driven by connecting rod (92).

Concerning the flow laminators (225), (225'), they are located at the entry points of the two mother chambers (205), (205') for the purpose of absorbing the turbulence created by the passage of the raw water or brine masses through the inlet and outlet valves (61), (61'). Their configuration may vary according to the size of the plant, the selected water speed, etc., although they are generally designed on the basis of a sheet lattice (95), concentric tubes (96) with radial sheets (97) or a plurality of parallel tubes (98). See FIGS. 41 to 43.

Figure 25:
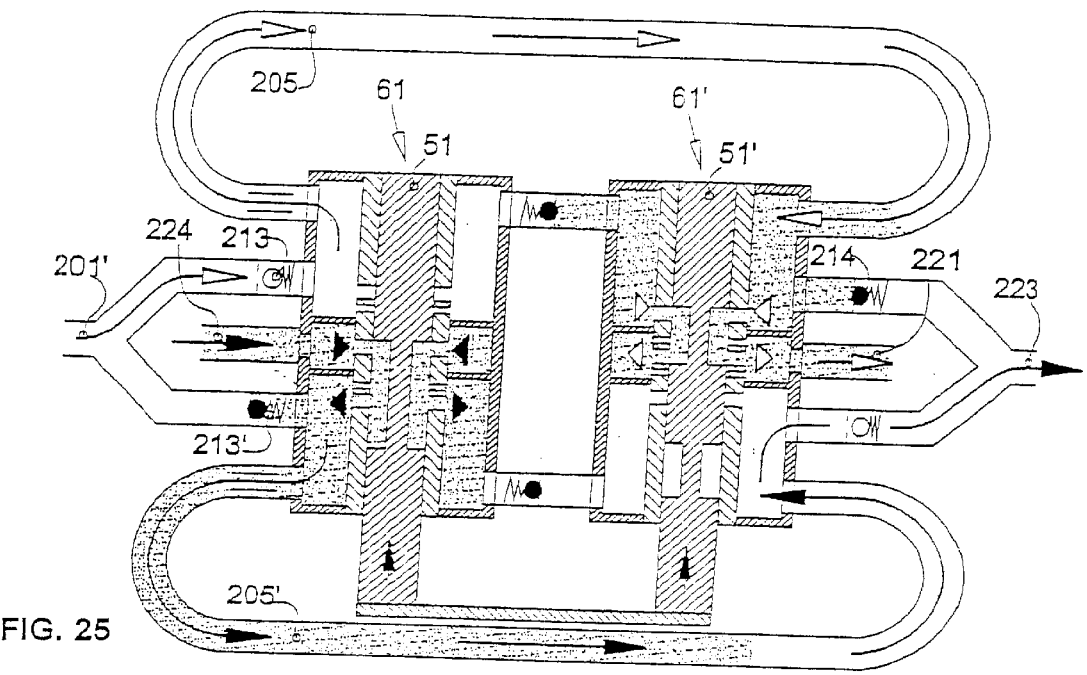

The description set forth starts in FIG. 25, where inlet and outlet slides (51), (51') are at the start of their stroke (low position). At this time, the feed water entering through auxiliary conduct (201') opens the non-return valve (213), while the other mother chamber (205) end is free to communicate with the exterior through the unloading conduct (221). At this time, the raw water entering through auxiliary conduct (201'), after passing through inlet valve (61) and outlet valve (61'), follows its course freely, exits through unload conduct (221) and thus expels the brine which at that moment occupies the first mother chamber (205).

The second mother chamber (205') is fully active, supplying its content of raw water through pressurized conduct (223) and up to the membrane (204), and receiving brine through return conduct (224). The position of slides (51), (51') allows free passage of the water, which fills the second mother chamber (205') and, because of its high pressure, maintains non-return valve (213') in closed position. Non-return valve (214) remains closed as a result of the lower pressure in the first mother chamber (205) in respect to pressurized conduct (223).

Figure 26:
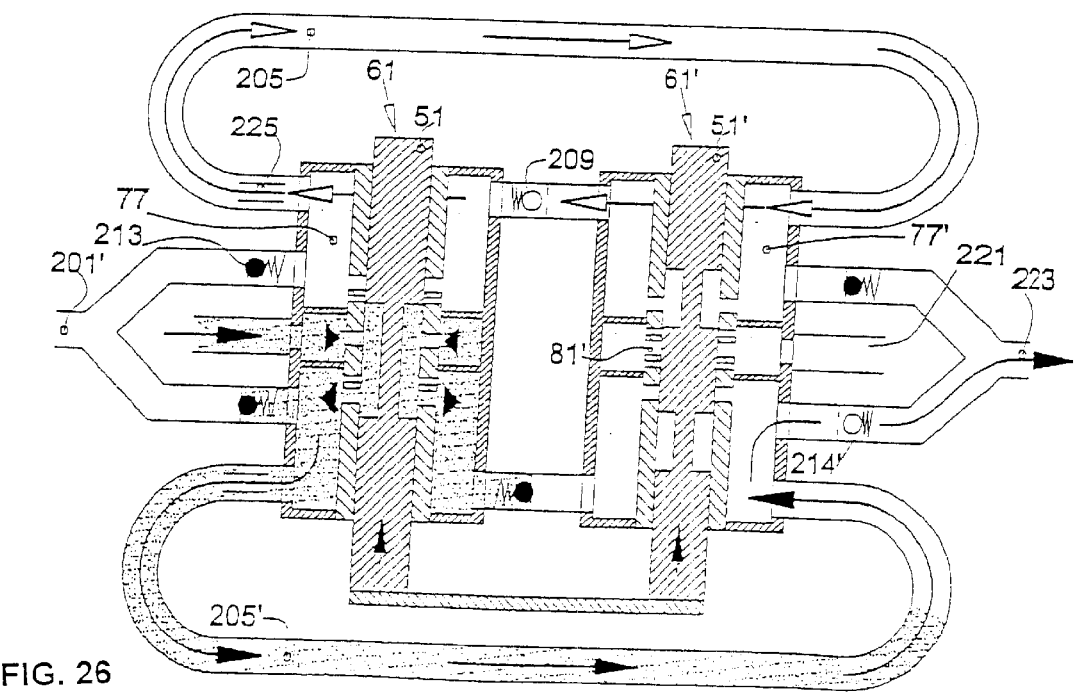

In FIG. 26, the valve slides advance to a point where outlet slide (51') closes the outlet manifold (81') ports while outlet valve (61') is fully closed in view that the common way, namely the center way, is closed. At this time, the first mother chamber (205), filled with raw water from the sea, receives no water supply from auxiliary conduct (201'), so that non-return valve (213) closes despite its low internal pressure, which is approximately the same as that of the auxiliary feeding conduct (201'). At this point, the water circulating inside the first mother chamber (205) finds the unload conduct (221) closed, the inertia of its movement thus finding no exit route and therefore opening the first recirculation valve (209) to allow passage of the water from the first outlet manifold (77') to the first inlet manifold (77), once again entering the first mother chamber (205) through flow laminator (225), whereby the first kinetic cycle step is organized. At this time, all the brine remaining in the first mother chamber (205) has been expelled.

Nothing has changed in mother chamber (205'), which remains as shown in FIG. 25. The brine has pushed virtually all the raw water towards membrane (204) through pressurized conduct (223).

Figure 27:
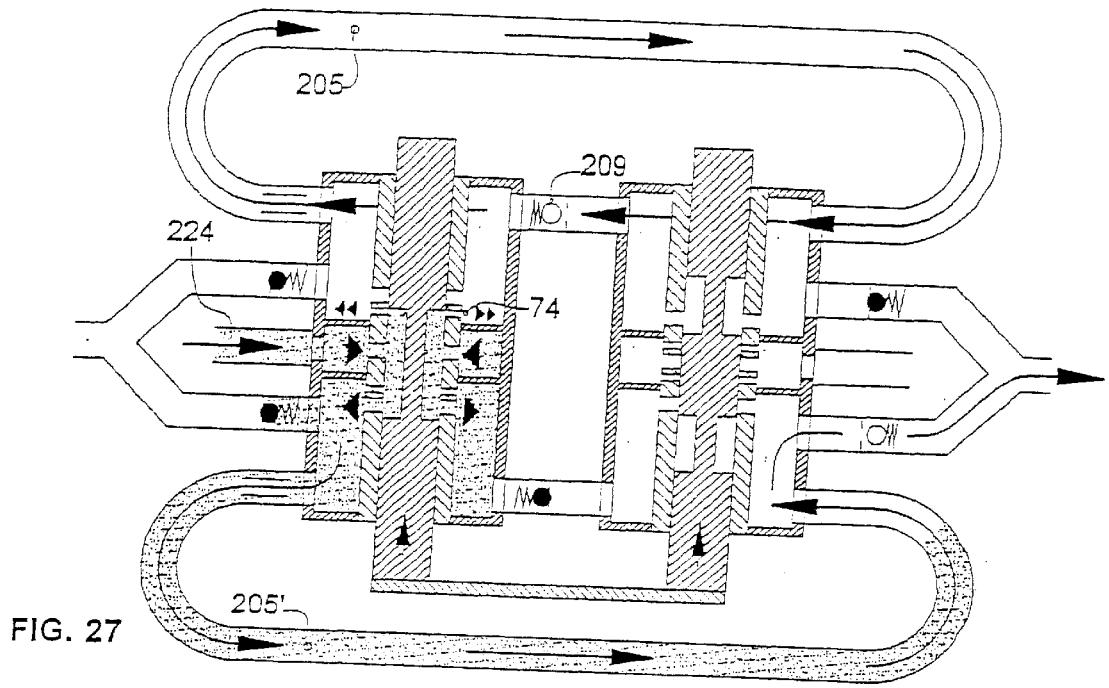

In FIG. 27, the slides in both valves have advanced a little further and are now positioned for the next step, in which the small prior pressurizing ports (74) open to implement the 'prior pressurizing' operation and pass the high pressure in return conduct (224) to the first mother chamber (205). This 'prior pressurizing' operation is effected through small orifices, as in an oil shock absorber, and solves two problems. The first is the descent of the pressure in membrane (204) because of the transfer of fluid from one chamber to the other as a result of the slight expansion caused by the resiliency of the low pressure chambers and conducts which suddenly become pressurized. The second undesirable effect solved by the 'prior pressurizing' operation is the sudden beating of the first recirculation valve (209) which, being open, is required to close at this stage.

Nothing has changed for second mother chamber (205'), which remains as shown in FIGS. 25 and 26.

Figure 28:
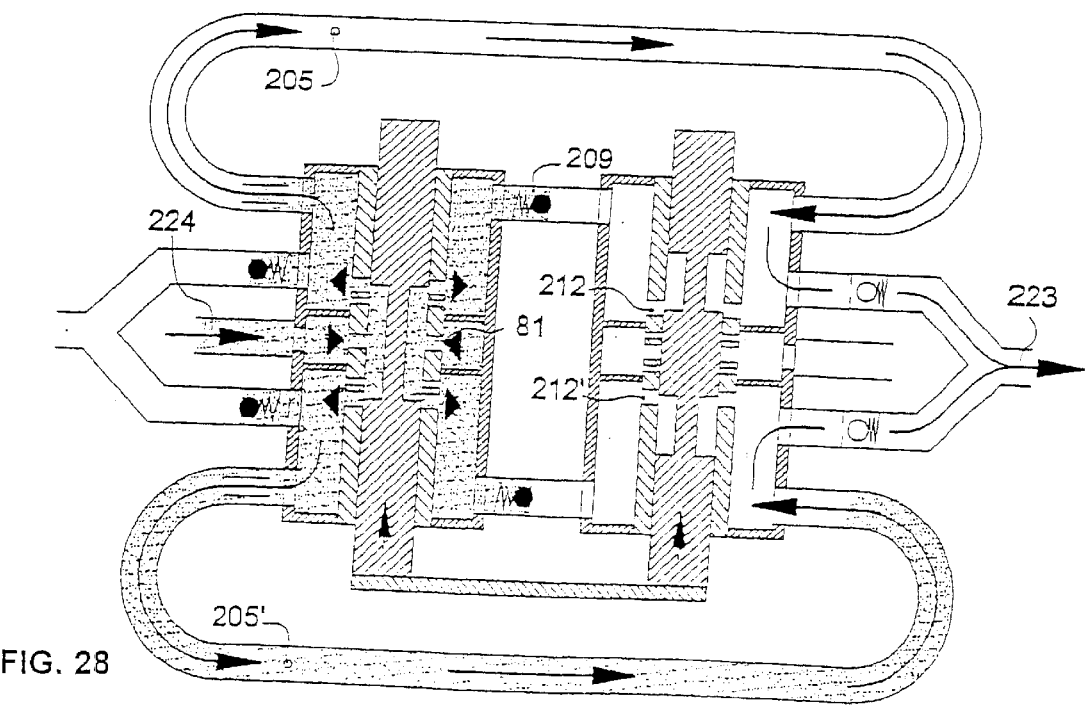

FIG. 28 shows that the slides have advanced a little further and reached the exact middle point in their stroke while the central inlet manifold ports (81) and the first and second outlet manifold ports (212), (212') are half-open, this meaning that the flows from both mother chambers (205), (205') feeding pressurized conduct (223) are distributed equally for each chamber. This is the transition point where the change is made in order that pressurized conduct (223) will continue to uninterruptedly supply water to membrane (204). Both mother chambers supply their raw water content to said pressurizing conduct (223).

Figure 29:
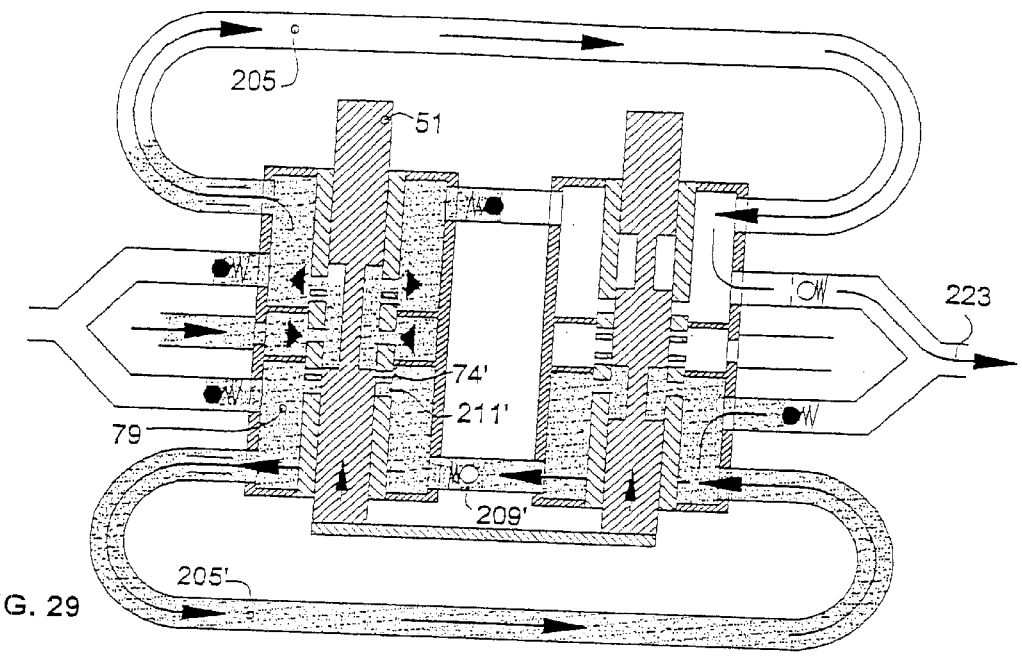

In FIG. 29, the slides proceed on their course. Inlet slide (51) closes brine and prior pressurizing ports (211'), (74') in the second inlet manifold (79), leaving the second mother chamber (205') without communication to the exterior while the first mother chamber (205) continues to operate as shown in FIG. 28. The brine content in the second mother chamber (205') is in motion at this stage, acting as shown in FIG. 26 for the first mother chamber (205), i.e. it begins to circulate in a loop as a result of the brine mass inertia opening the second recirculation pump (209') (a basic element of the invention). The second mother chamber (205') is still under pressure.

Figure 30:
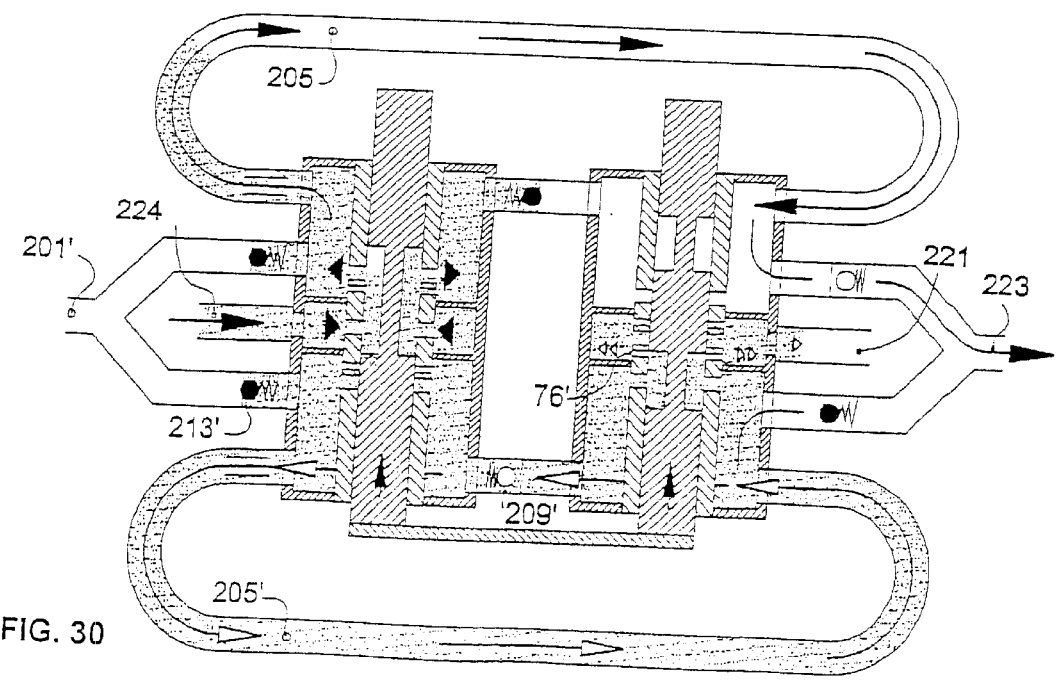

In FIG. 30, the slides advance a little further while the first mother chamber (205) is functioning as in FIG. 29, although, when the prior depressurizing ports (76') open, the high pressure water in the second mother chamber (205') descends to atmospheric pressure as the brine is let out to the sea through unload conduct (221), thus enabling the low pressure in auxiliary conduct (201') to open the non-return valve (213') through the very small outlet in the prior depressurizing ports (76'). This prior depressurizing operation is not as important as the 'prior pressurizing' operation described in FIG. 27, since the water flows outwards under pressure in a quantity as small as that which the mother chambers are capable of storing because of their expansion under high pressure; however, the slight noise originated can be avoided.

Figure 31:
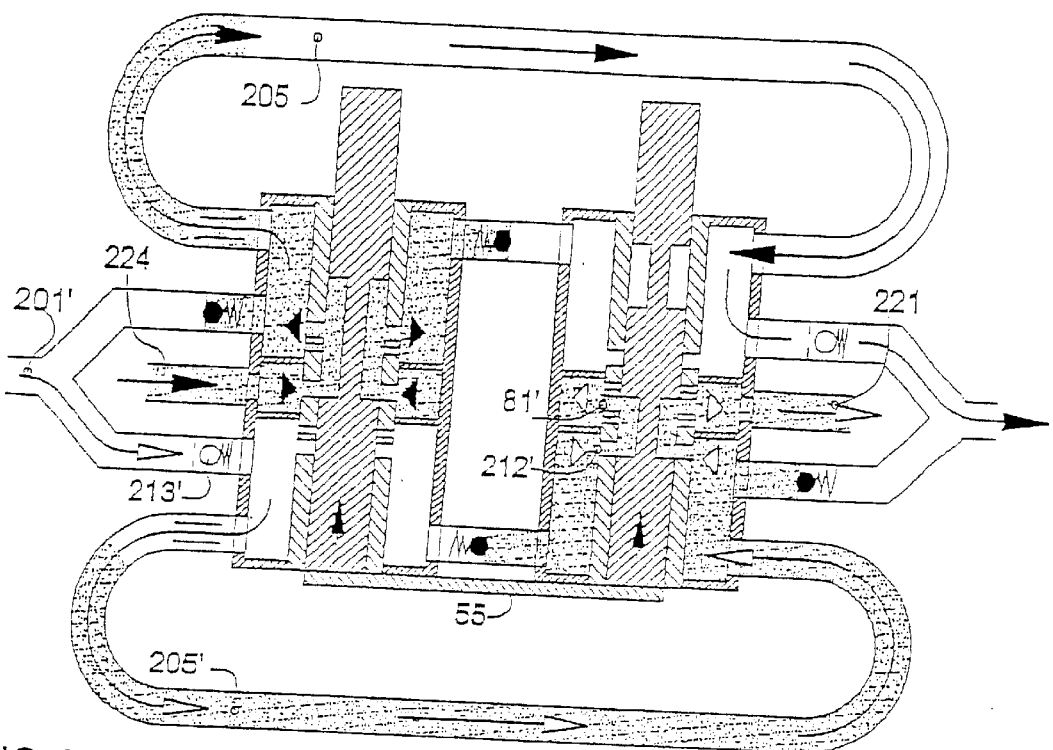

FIG. 31 shows the end of the slide valve semi-cycle, with both valves positioned at the end of their stroke while the first mother chamber (205) keeps on functioning as in FIG. 30, the second mother chamber (205') continues to evacuate brine through unloading conduct (221), and raw water enters through auxiliary conduct (201') in view that the non-return valve (213') and the brine unloading ports (212') and central outlet manifold ports (81') are fully open while the contents of the second mother chamber (205') exit, as previously indicated, through unloading conduct (221).

The slides are now at the end of their stroke; once the time has elapsed for filling the second mother chamber (205') with raw water and the raw water occupying the first mother chamber (205) has been replaced by the brine entering via return conduct (224), the slide valve stroke direction is inverted and the cycle repeats itself as described heretofore.

FIGS. 36 to 40 show the epicycloid mechanical operation related to the various continuous kinetic cycle desalination plant operation phases. Thus, FIGS. 36 and 37 correspond to the same valve position shown in FIG. 25, with the first mother chamber (205) in the raw water filling stage and the second mother chamber (205') supplying pressurized raw water to the permeable membrane (204) through pressurized conduct (223). The time elapsed between the planetary gear (93) positions shown in FIGS. 36 and 37 is a dead time in which no bridge (55) movement is evident, allowing the first mother chamber (205) to be filled with raw water and the whole amount of raw water occupying the second mother chamber (205') to be supplied through pressurized conduct (223) toward the membrane (204).

FIG. 38 shows the moment in which the prior pressurizing ports (74) open, the positions of the various valves being shown in FIG. 27 while the first mother chamber (205) is in its continuous kinetic cycle and the second mother chamber (205') is ending its supply of pressurized raw water.

FIG. 39 shows the moment in which the second mother chamber (205') is being prior depressurized, with the valves positioned as shown in FIG. 30, and the brine occupying the second mother chamber (205') is in its continuous kinetic cycle while the first mother chamber (205) begins its supply of pressurized raw water.

Finally, FIG. 40 shows the end of the planetary gear (93) semi-cycle and a new dead period is initiated during which the total amount of pressurized raw water occupying the first mother chamber (205) must be supplied and the total filling of the second mother chamber (205') with raw water must be implemented.

FIGS. 32 to 35 show an industrial embodiment of the object of the invention. As can be seen, the mother chambers (205), (205'), the inlet and outlet valves (61), (61') and the recirculation and non-return valves (209), (209'), (213), (213'), (214), (214') form a compact assembly which may be readily transported in mounted condition. Instead of indulging in installation work, all that is needed is for the various auxiliary (201'), pressurized (223), return (224) and unloading (221) conducts to be mounted and the pumps to be connected.

What is claimed is:

1. An inverse osmosis water desalinating plant fitted with pressurized continuous kinetic cycle mother chambers,
   wherein the pressurized continuous kinetic cycle mother chambers comprise a first mother chamber and a second mother chamber which are alternatively pressurized; wherein the inverse osmosis water desalinating plant further comprises:
   a high pressure pump installed in parallel with an internal circulation pump;
   wherein the first mother chamber forms a first closed circuit; wherein the second mother chamber forms a second closed circuit; wherein the first closed circuit is separate from the second closed circuit; and wherein, during operation of the inverse osmosis water desalinating plant, water is able to circulate inside each mother chamber at all times in one direction and in a continuous fashion.

2. The inverse osmosis water desalinating plant as claimed in claim 1, wherein a sequential function multiple valve with six ways is provided.

3. The inverse osmosis water desalinating plant as claimed in claim 2, wherein said multiple valve is formed by an empty cylinder with corresponding outlets and an internally sliding piston fitted with circular grooves and a means of imperviousness, wherein the multiple valve comprises two grooves and six outlets.

4. The inverse osmosis water desalinating plant as claimed in claim 1, wherein the first mother chamber has a toroidal, oval, zigzag, helicoidal, or other shape; and wherein the second mother chamber has a toroidal, oval, zigzag, helicoidal, or other shape.

5. The inverse osmosis water desalinating plant as claimed in claim 1, wherein the first mother chamber comprises a first mother chamber first end and a first mother chamber second end, wherein the first mother chamber first end is connected to the first mother chamber second end to form the first closed circuit;

wherein the second mother chamber comprises a second mother chamber first end and a second mother chamber second end, wherein the second mother chamber first end is connected to the second mother chamber second end to form the second closed circuit; and wherein the first closed circuit and the second closed circuit do not share a common chamber portion.

6. The inverse osmosis water desalinating plant as claimed in claim 5, wherein the first mother chamber has a toroidal, oval, zigzag, or helicoidal shape; and wherein the second mother chamber has a toroidal, oval, zigzag, or helicoidal shape.

7. The inverse osmosis water desalinating plant as claimed in claim 5, wherein each mother chamber comprises a means of separation between different salinity water masses, wherein each means of separation comprises a piston of an apparent density similar to that of the water.

8. The inverse osmosis water desalinating plant as claimed in claim 7, wherein each piston is received in a corresponding rotating basket fitted with a non-return valve.

9. The inverse osmosis water desalinating plant as claimed in claim 8, wherein each piston with the corresponding basket acquires a bypass position in response to a concealment strategy.

10. The inverse osmosis water desalinating plant as claimed in claim 5, wherein each mother chamber comprises a means of separation between different salinity water masses, wherein each means of separation comprises two pistons on an apparent density similar to that of water which are liable to be blocked by clamps which strangle a section of tube inside of which the pistons circulate.

11. The inverse osmosis water desalinating plant as claimed in claim 5, wherein the first and second mother chambers do not include a physical means of separation between different salinity water masses, wherein separation between the different salinity water masses is achieved through water flow adjustments which render flow of the water circulating inside the first and second mother chambers as laminar as possible and which prevent a turbulent condition from being reached, and wherein flow meters are provided in the plant to produce cycle switching in the mother chambers according to supplied flows or by means of water salinity or conductivity measurements.

12. The inverse osmosis water desalinating plant as claimed in claim 11, wherein the desalinating plant further comprises:

an inlet valve formed by an inlet slide having a shape of a solid cylinder with an annular groove that slides axially inside an inlet cylinder, which forms, jointly with an inlet housing, an annular space divided into a first inlet manifold, a central manifold, and a second inlet manifold by means of a first annular inlet separator and a second annular inlet separator; the inlet cylinder presenting a first central inlet manifold port and a first prior pressurizing port in correspondence with the first inlet manifold, a central inlet manifold port in correspondence with the central inlet manifold, and a second central inlet manifold port and a second prior pressurizing port in correspondence with the second inlet manifold;

an outlet valve formed by an outlet slide having a shape of a solid cylinder with two annular grooves, which forms, jointly with an outlet housing, an annular space divided into a first inlet manifold, a central outlet manifold, and a second outlet manifold by means of a first annular outlet separator and a second annular outlet separator; the outlet cylinder presenting a first outlet port in correspondence with the first outlet manifold, a central outlet manifold port in correspondence with the central outlet manifold, and a second outlet port in correspondence with the second outlet manifold;

a driving bridge which secures the inlet valve to the outlet valve; wherein the first mother chamber first end is connected to the first inlet manifold and the first mother chamber second end is connected to the first outlet manifold; and wherein the second mother chamber first end is connected to the second inlet manifold and the second mother chamber second end is connected to the second outlet manifold;

an auxiliary conduct, which receives raw water supplied by an auxiliary pump and leads the raw water to the first inlet manifold and to the second inlet manifold via respective first non-return valves;

a pressurized conduct attached to the first outlet manifold and the second outlet manifold via respective second non-return valves, wherein the pressurized conduct leads the raw water to be desalinated to an inverse osmosis membrane;

a return conduct which starts from the inverse osmosis membrane and leads reject brine to the central inlet manifold in the inlet valve;

an unloading conduct coupled to central outlet manifold in the outlet valve;

a first non-return recirculation valve allowing passage from the first outlet manifold to the first inlet manifold; and a second non-return recirculation valve allowing passage from the second outlet manifold to the second inlet manifold.

13. The inverse osmosis water desalinating plant as claimed in claim 12, wherein the outlet cylinder presents two series of prior pressurizing ports, one on each side of the central outlet manifold port.

14. The inverse osmosis water desalinating plant as claimed in claim 12, wherein operation of said driving bridge is through a variable sequence which establishes stops in extreme points of its stroke and a slowing-down in intermediate points coinciding with opening of the first and second prior pressurizing ports.

15. The inverse osmosis water desalinating plant as claimed in claim 14, wherein operation of said driving bridge is implemented through an epicycloid mechanism comprising a fixed central dented wheel around which rotates a planetary gear and at a periphery of which is operationally attached an end of a drive connecting rod which moves a drive rod fitted with two butt ends designed to draw the driving bridge that is attached to the inlet valve and the outlet valve.

16. The inverse osmosis water desalinating plant as claimed in claim 12, wherein at each inlet to the first and second mother chambers a flow laminator is installed for absorbing turbulence generated by passage of the raw water or brine through the inlet valve and the outlet valve.

17. The inverse osmosis water desalinating plant as claimed in claim 16, wherein the flow laminator is formed by a sheet lattice.

18. The inverse osmosis water desalinating plant as claimed in claim 16, wherein the flow laminator is formed by a plurality of concentric tubes combined with radial sheets.

19. The inverse osmosis water desalinating plant as claimed in claim 16, wherein the flow laminator is formed by a plurality of parallel tubes.

20. The inverse osmosis water desalinating plant as claimed in claim 5, wherein a sequential function multiple valve with six ways is provided.

21. The inverse osmosis water desalinating plant as claimed in claim 20, wherein said multiple valve is formed by an empty cylinder with corresponding outlets and an internally sliding piston fitted with circular grooves and a means of imperviousness, wherein the multiple valve comprises two grooves and six outlets.

22. An inverse osmosis water desalinating plant fitted with pressurized continuous kinetic cycle mother chambers, wherein the pressurized continuous kinetic cycle mother chambers comprise a first mother chamber and a second mother chamber which are alternatively pressurized; wherein the inverse osmosis water desalinating plant further comprises:

a high pressure pump installed in parallel with an internal circulation pump;

wherein the first mother chamber forms a first closed circuit; wherein the second mother chamber forms a second closed circuit; wherein, during operation of the inverse osmosis water desalinating plant, water is able to circulate inside each mother chamber at all times in one direction and in a continuous fashion; and wherein each mother chamber comprises a means of separation between different salinity water masses, wherein each means of separation comprises a sphere-shaped piston of an apparent density similar to that of the water.

23. The inverse osmosis water desalinating plant as claimed in claim 22, wherein each piston is received in a corresponding rotating basket fitted with a non-return valve.

24. The inverse osmosis water desalinating plant as claimed in claim 23, wherein each piston with the corresponding basket acquires a bypass position in response to a concealment strategy.

25. An inverse osmosis water desalinating plant fitted with pressurized continuous kinetic cycle mother chambers, wherein the pressurized continuous kinetic cycle mother chambers comprise a first mother chamber and a second mother chamber which are alternatively pressurized; wherein the inverse osmosis water desalinating plant further comprises:

a high pressure pump installed in parallel with an internal circulation pump;

wherein the first mother chamber forms a first closed circuit; wherein the second mother chamber forms a second closed circuit; wherein, during operation of the inverse osmosis water desalinating plant, water is able to circulate inside each mother chamber at all times in one direction and in a continuous fashion; and wherein each mother chamber comprises a means of separation between different salinity water masses, wherein each means of separation comprises two sphere-shaped pistons of an apparent density similar to that of water which are liable to be blocked by clamps which strangle a section of tube inside of which the pistons circulate.

26. An inverse osmosis water desalinating plant fitted with pressurized continuous kinetic cycle mother chambers, wherein the pressurized continuous kinetic cycle mother chambers comprise a first mother chamber and a second mother chamber which are alternatively pressurized; wherein the inverse osmosis water desalinating plant further comprises:

a high pressure pump installed in parallel with an internal circulation pump;

wherein the first mother chamber forms a first closed circuit; wherein the second mother chamber forms a second closed circuit; wherein, during operation of the inverse osmosis water desalinating plant, water is able to circulate inside each mother chamber at all times in one direction and in a continuous fashion; and wherein the first and second mother chambers do not include a physical means of separation between different salinity water masses, wherein separation between the different salinity water masses is achieved through water flow adjustments which render flow of the water circulating inside the first and second mother chambers as laminar as possible and which prevent a turbulent condition from being reached, and wherein flow meters are provided in the plant to produce cycle switching in the mother chambers according to supplied flows or by means of water salinity or conductivity measurements.

27. The inverse osmosis water desalinating plant as claimed in claim 26, wherein the desalinating plant further comprises:

an inlet valve formed by an inlet slide having a shape of a solid cylinder with an annular groove that slides axially inside an inlet cylinder, which forms, jointly with an inlet housing, an annular space divided into a first inlet manifold, a central manifold, and a second inlet manifold by means of a first annular inlet separator and a second annular inlet separator; the inlet cylinder presenting a first central inlet manifold port and a first prior pressurizing port in correspondence with the first inlet manifold, a central inlet manifold port in correspondence with the central inlet manifold, and a second central inlet manifold port and a second prior pressurizing port in correspondence with the second inlet manifold;

an outlet valve formed by an outlet slide having a shape of a solid cylinder with two annular grooves, which forms, jointly with an outlet housing, an annular space divided into a first inlet manifold, a central outlet manifold, and a second outlet manifold by means of a first annular outlet separator and a second annular outlet separator; the outlet cylinder presenting a first outlet port in correspondence with the first outlet manifold, a central outlet manifold port in correspondence with the central outlet manifold, and a second outlet port in correspondence with the second outlet manifold;

a driving bridge which secures the inlet valve to the outlet valve; wherein the first mother chamber comprises a first mother chamber first end connected to the first inlet manifold and a first mother chamber second end connected to the first outlet manifold; and wherein the second mother chamber comprises a second mother chamber first end connected to the second inlet manifold and a second mother chamber second end connected to the second outlet manifold;

an auxiliary conduct, which receives raw water supplied by an auxiliary pump and leads the raw water to the first inlet manifold and to the second inlet manifold via respective first non-return valves;

a pressurized conduct attached to the first outlet manifold and the second outlet manifold via respective second non-return valves, wherein the pressurized conduct leads the raw water to be desalinated to an inverse osmosis membrane;

a return conduct which starts from the inverse osmosis membrane and leads reject brine to the central inlet manifold in the inlet valve;

an unloading conduct coupled to central outlet manifold in the outlet valve;

a first non-return recirculation valve allowing passage from the first outlet manifold to the first inlet manifold; and a second non-return recirculation valve allowing passage from the second outlet manifold to the second inlet manifold.

28. The inverse osmosis water desalinating plant as claimed in claim 27, wherein the outlet cylinder presents two series of prior pressurizing ports, one on each side of the central outlet manifold port.

29. The inverse osmosis water desalinating plant as claimed in claim 27, wherein operation of said driving bridge is through a variable sequence which establishes stops in extreme points of its stroke and a slowing-down in intermediate points coinciding with opening of the first and second prior pressurizing ports.

30. The inverse osmosis water desalinating plant as claimed in claim 29, wherein operation of said driving bridge is implemented through an epicycloid mechanism comprising a fixed central dented wheel around which rotates a planetary gear and at a periphery of which is operationally attached an end of a drive connecting rod which moves a drive rod fitted with two butt ends designed to draw the driving bridge that is attached to the inlet valve and the outlet valve.

31. The inverse osmosis water desalinating plant as claimed in claim 27, wherein at each inlet to the first and second mother chambers a flow laminator is installed for absorbing turbulence generated by passage of the raw water or brine through the inlet valve and the outlet valve.

32. The inverse osmosis water desalinating plant as claimed in claim 31, wherein the flow laminator is formed by a sheet lattice.

33. The inverse osmosis water desalinating plant as claimed in claim 31, wherein the flow laminator is formed by a plurality of concentric tubes combined with radial sheets.

34. The inverse osmosis water desalinating plant as claimed in claim 31, wherein the flow laminator is formed by a plurality of parallel tubes.

* * * * *